United States Patent
Tang et al.

(10) Patent No.: US 8,593,737 B2
(45) Date of Patent: Nov. 26, 2013

(54) PHOTOGRAPHING OPTICAL LENS ASSEMBLY

(75) Inventors: Hsiang-Chi Tang, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 10 days.

(21) Appl. No.: 13/430,884

(22) Filed: Mar. 27, 2012

(65) Prior Publication Data

US 2013/0057967 A1 Mar. 7, 2013

(30) Foreign Application Priority Data

Sep. 2, 2011 (TW) .................................. 100131776

(51) Int. Cl.
*G02B 9/60* (2006.01)
*G02B 3/02* (2006.01)

(52) U.S. Cl.
USPC .......................................... 359/714; 359/770

(58) Field of Classification Search
CPC ............ G02B 13/18; G02B 9/60; G02B 9/34; G02B 9/62; G02B 9/64
USPC ......... 359/713, 714, 763, 770, 708, 745, 746, 359/754–756, 761
See application file for complete search history.

(56) References Cited

U.S. PATENT DOCUMENTS

| | | | |
|---|---|---|---|
| 7,365,920 B2 | 4/2008 | Noda | |
| 7,502,180 B2 * | 3/2009 | Tsuchimochi | 359/749 |
| 8,248,713 B2 * | 8/2012 | Hsieh et al. | 359/753 |
| 2011/0176049 A1 * | 7/2011 | Hsieh et al. | 348/340 |

* cited by examiner

*Primary Examiner* — Darryl J Collins
(74) *Attorney, Agent, or Firm* — Maschoff Brennan

(57) ABSTRACT

An photographing optical lens assembly includes, in order from an object side to an image side, a first lens element with negative refractive power including a convex object-side surface, a second lens element with positive refractive power, a third lens element with positive refractive power including a concave object-side surface and a convex image-side surface, a fourth lens element with negative refractive power includes a concave object-side surface and a convex image-side surface, and a fifth lens element with positive refractive power including an image-side surface, an object-side surface and at least one inflection point. At least one of the object-side surface and the image-side surface of the fifth lens element is aspheric. By adjusting the photographing optical lens assembly, the total length of the photographing optical lens assembly is reduced, the aberration is corrected, and the image quality is improved.

17 Claims, 12 Drawing Sheets

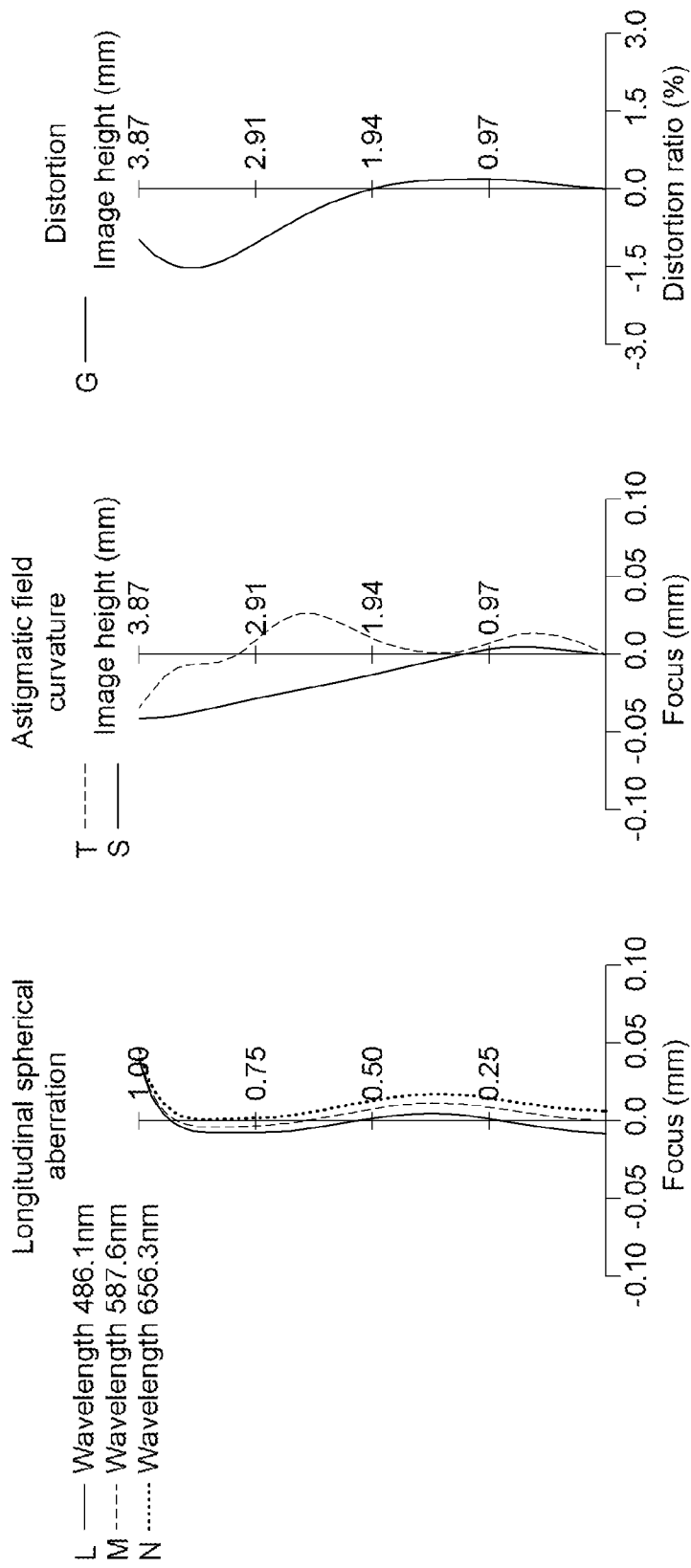

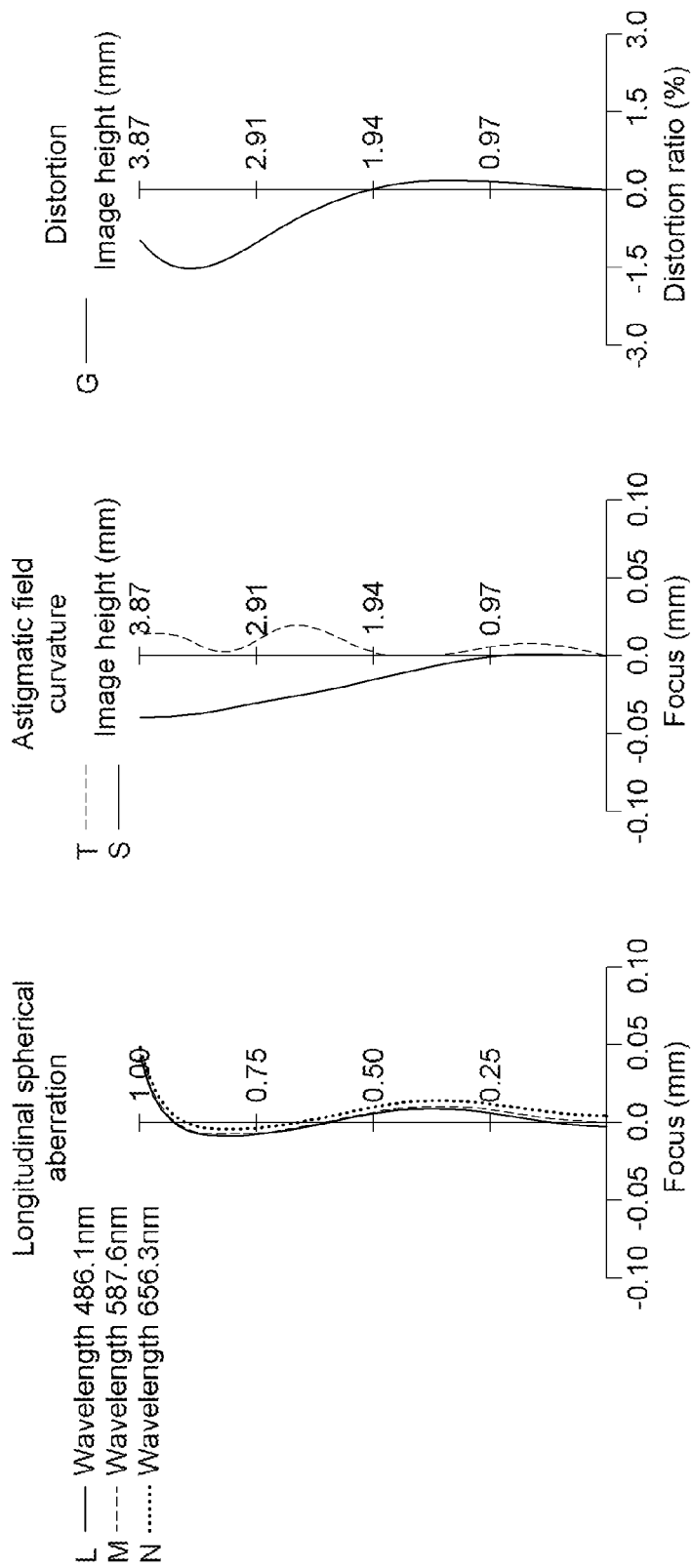

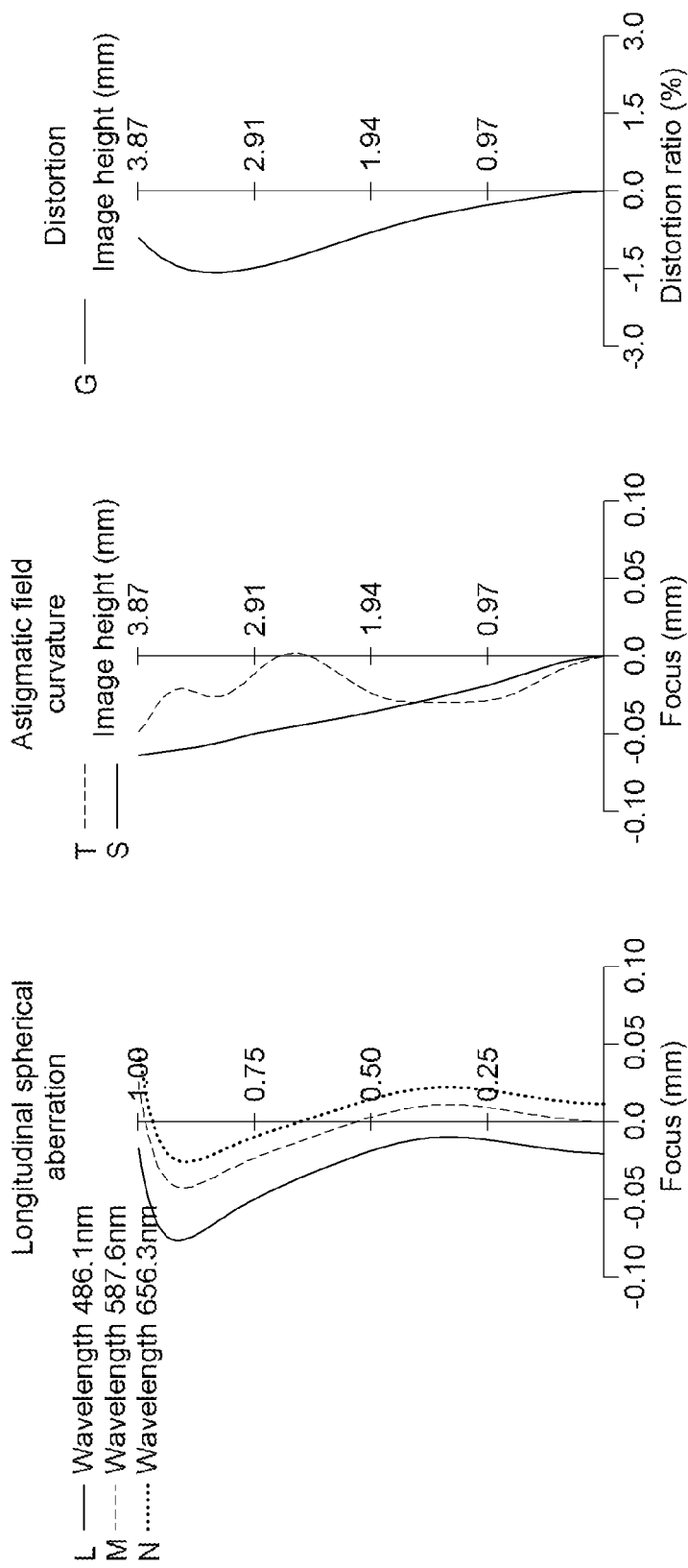

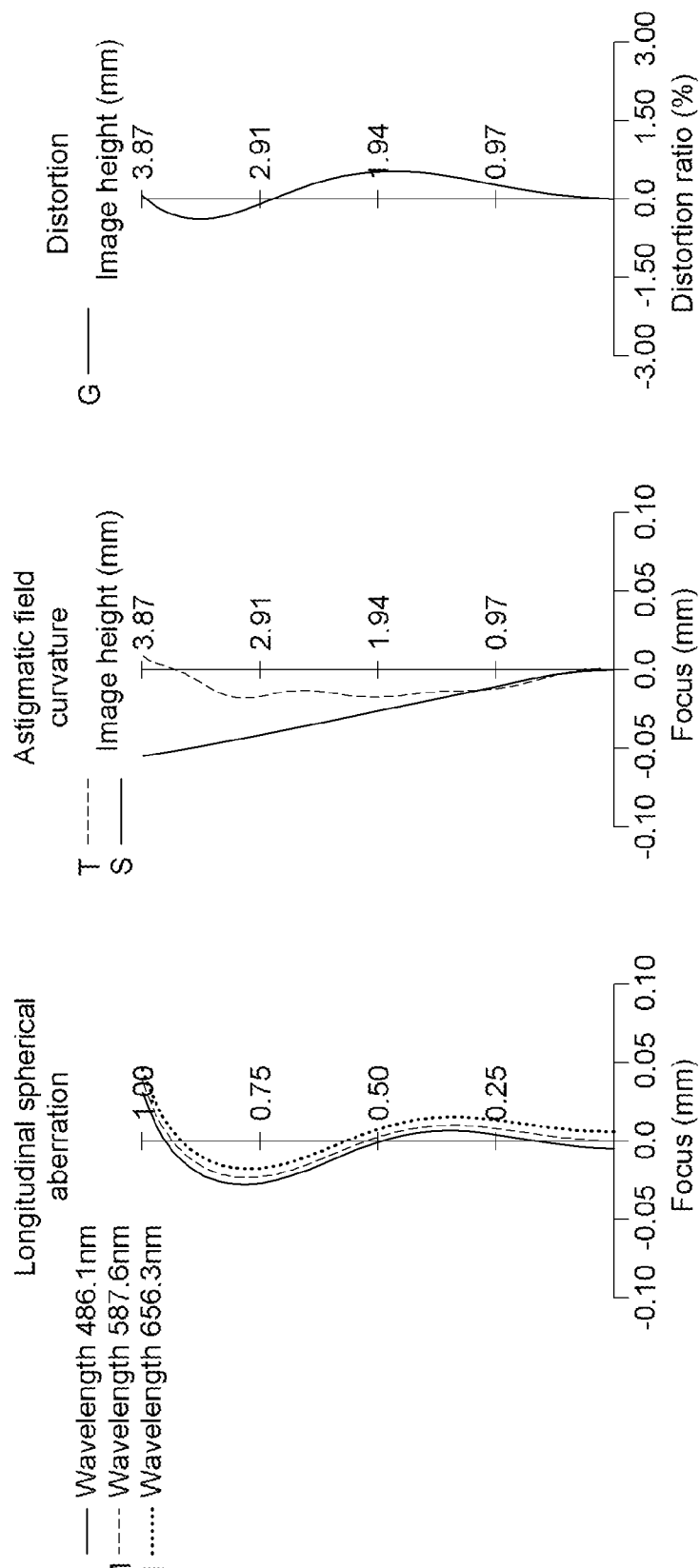

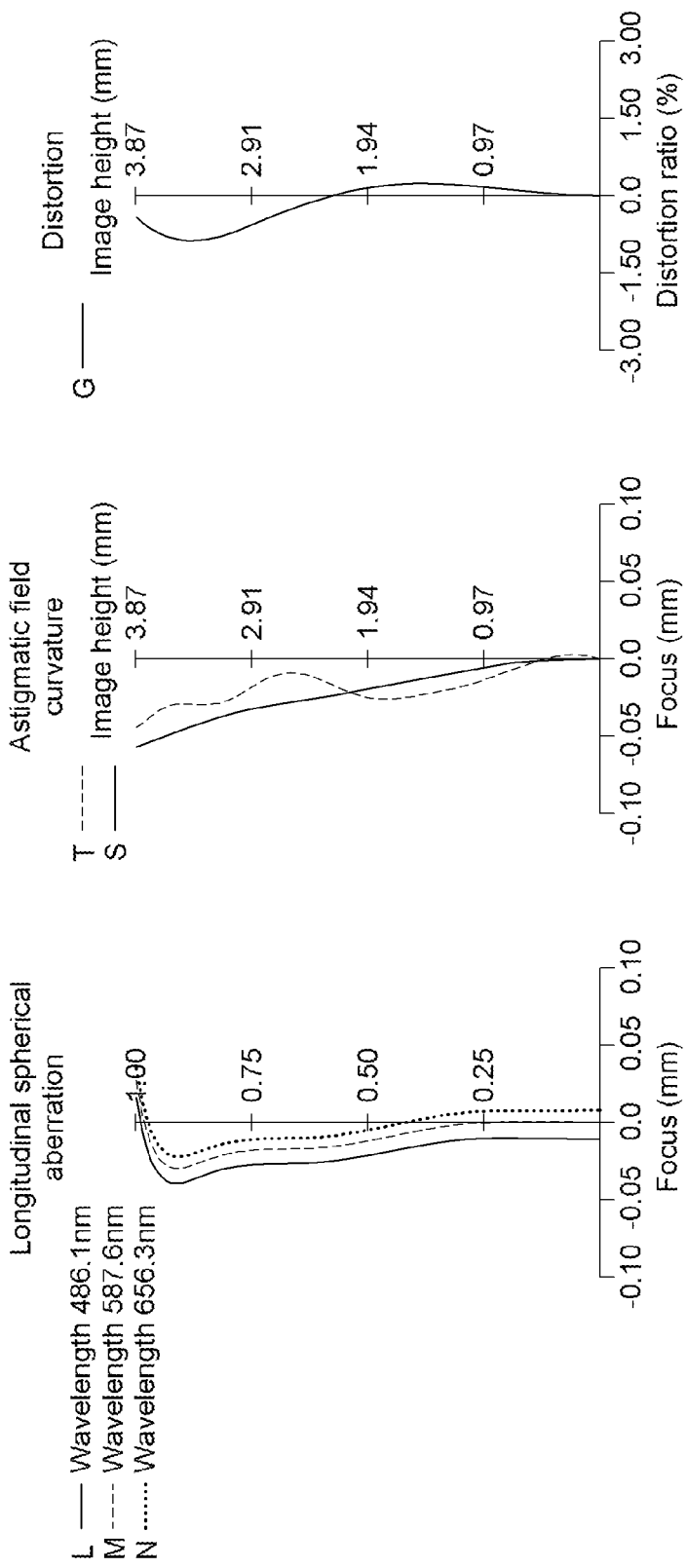

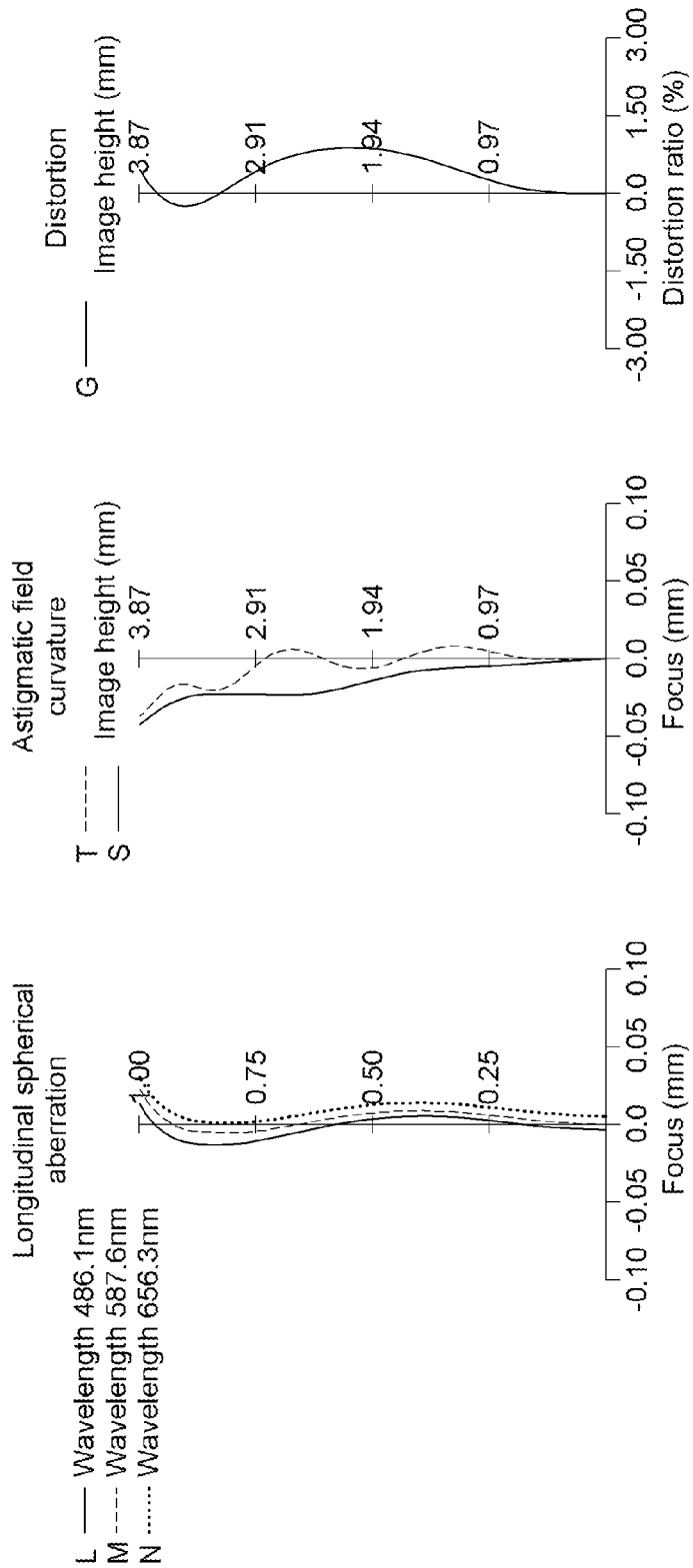

PHOTOGRAPHING OPTICAL LENS ASSEMBLY

CROSS-REFERENCE TO RELATED APPLICATIONS

This non-provisional application claims priority under 35 U.S.C. §119(a) on Patent Application No(s). 100131776 filed in Taiwan, R.O.C. on Sep. 2, 2011, the entire contents of which are hereby incorporated by reference.

BACKGROUND

1. Technical Field

The present disclosure relates to a photographing optical lens assembly, and more particularly to a photographing optical lens assembly having multiple lenses.

2. Related Art

In recent years, with the prosperity of photographing optical lens assemblies, the demands for compact photographing cameras rise exponentially. The photo-sensing device, e.g. a sensor, of an ordinary photographing camera is commonly selected from a charge coupled device (CCD) and a complementary metal-oxide semiconductor (CMOS) device. In addition, with the advance of semiconductor manufacturing technology enabling the miniaturization of pixel size of sensors, there are increasing demands for compact optical lens assemblies capable of generating better quality images.

A conventional compact photographing lens used in a mobile electronic device usually consists of four lens elements, which is disclosed in U.S. Pat. No. 7,365,920. As the high technology mobile devices, such as smart phones or PDA (Personal Digital Assistant), gain in popularity, demands for the compact photographing lens with better resolution and image quality rise exponentially. However, the conventional four-lens assembly does not meet the requirement of the high-level photographing optical lens assembly. With the electronic devices heading towards the direction of high functionality while being as small and light as possible, the inventors recognize that optical imaging system capable of improving the image quality of mobile electronic devices as well as miniaturizing the overall size of the camera lens equipped therewith are urgently needed.

SUMMARY

According to an embodiment, a photographing optical lens assembly comprises, in order from an object side to an image side: a first lens element with negative refractive power, a second lens element with positive refractive power, a third lens element with positive refractive power, a fourth lens element with negative refractive power, and a fifth lens element with positive refractive power. The first lens element comprises a convex object-side surface. The third lens element comprises a concave object-side surface and a convex image-side surface. The fourth lens element comprises a concave object-side surface and a convex image-side surface. The fifth lens element comprises an image-side surface and an object-side surface, and at least one of the image-side surface and the object-side surface of the fifth lens element is aspheric. The fifth lens element further comprises at least one inflection point.

According to an embodiment, a photographing optical lens assembly comprises, in order from an object side to an image side: a front lens group and a rear lens group. The front lens group comprises two lenses with refractive power and a stop. The two lenses with refractive power are, in order from the object side to the image side, a first lens element with negative refractive power and a second lens element with positive refractive power. The first lens element comprises a convex object-side surface. The rear lens group comprises, in order from the object side to the image side: a third lens element with positive refractive power, a fourth lens element with negative refractive power, and a fifth lens element with positive refractive power. The fourth lens element comprises a concave object-side surface and a convex image-side surface. The fifth lens element comprises a convex object-side surface and an image-side surface. At least one of the image-side surface and the object-side surface of the fifth lens element is aspheric. The fifth lens element further comprises at least one inflection point.

The photographing optical lens assembly further comprises an image plane. The photographing optical lens assembly satisfies the following conditions:

$$0.75 < SD/TD < 1.1; \quad \text{(Condition 1)}$$

$$0.75 < f/f_2 < 1.7; \text{ and} \quad \text{(Condition 2)}$$

$$0.1 < T_{12}/T_{23} < 4.0; \quad \text{(Condition 3)}$$

Wherein $T_{12}$ is the axial distance between the first lens element and the second lens element; $T_{23}$ is the axial distance between the second lens element and the third lens element; SD is the axial distance between the stop and the image-side surface of the fifth lens element; TD is the axial distance between the object-side surface of the first lens element and the image-side surface of the fifth lens element; f is the focal length of the photographing optical lens assembly; $f_2$ is the focal length of the second lens element.

According to another embodiment, a photographing optical lens assembly comprises, in order from an object side to an image side: a first lens element with negative refractive power, a second lens element with positive refractive power, a third lens element with positive refractive power, a fourth lens element with negative refractive power and a fifth lens element with positive refractive power. The first lens element comprises a convex object-side surface. The fourth lens element comprises a concave object-side surface and a convex image-side surface. The fifth lens element comprises a convex object-side surface and an image-side surface. At least one of the object-side surface and the image-side surface of the fifth lens element is aspheric. The fifth lens element further comprises at least one inflection point.

The photographing optical lens assembly further comprises a stop and an image plane. The photographing optical lens assembly satisfies the condition 1.

BRIEF DESCRIPTION OF THE DRAWINGS

The present disclosure will become more fully understood from the following detailed description when taken in connection with the accompanying drawings, which show, for purpose of illustrations only, and thus do not limit other possible embodiments derived from the spirit of the present disclosure, and wherein:

FIG. 1B is a graph of longitudinal spherical aberration curves in the photographing optical lens assembly in FIG. 1A;

FIG. 1C is a graph of astigmatic field curves in the photographing optical lens assembly in FIG. 1A;

FIG. 1D is a graph of a distortion curve in the photographing optical lens assembly in FIG. 1A;

FIG. 2B is a graph of longitudinal spherical aberration curves in the photographing optical lens assembly in FIG. 2A;

FIG. 2C is a graph of astigmatic field curves in the photographing optical lens assembly in FIG. 2A;

FIG. 2D is a graph of a distortion curve in the photographing optical lens assembly in FIG. 2A;

FIG. 3B is a graph of longitudinal spherical aberration curves in the photographing optical lens assembly in FIG. 3A;

FIG. 3C is a graph of astigmatic field curves in the photographing optical lens assembly in FIG. 3A;

FIG. 3D is a graph of a distortion curve in the photographing optical lens assembly in FIG. 3A;

FIG. 4B is a graph of longitudinal spherical aberration curves in the photographing optical lens assembly in FIG. 4A;

FIG. 4C is a graph of astigmatic field curves in the photographing optical lens assembly in FIG. 4A;

FIG. 4D is a graph of a distortion curve in the photographing optical lens assembly in FIG. 4A;

FIG. 5B is a graph of longitudinal spherical aberration curves in the photographing optical lens assembly in FIG. 5A;

FIG. 5C is a graph of astigmatic field curves in the photographing optical lens assembly in FIG. 5A;

FIG. 5D is a graph of a distortion curve in the photographing optical lens assembly in FIG. 5A;

FIG. 6B is a graph of longitudinal spherical aberration curves in the photographing optical lens assembly in FIG. 6A;

FIG. 6C is a graph of astigmatic field curves in the photographing optical lens assembly in FIG. 6A; and FIG. 6D is a graph of a distortion curve in the photographing optical lens assembly in FIG. 6A.

DETAILED DESCRIPTION

Figure 1A:
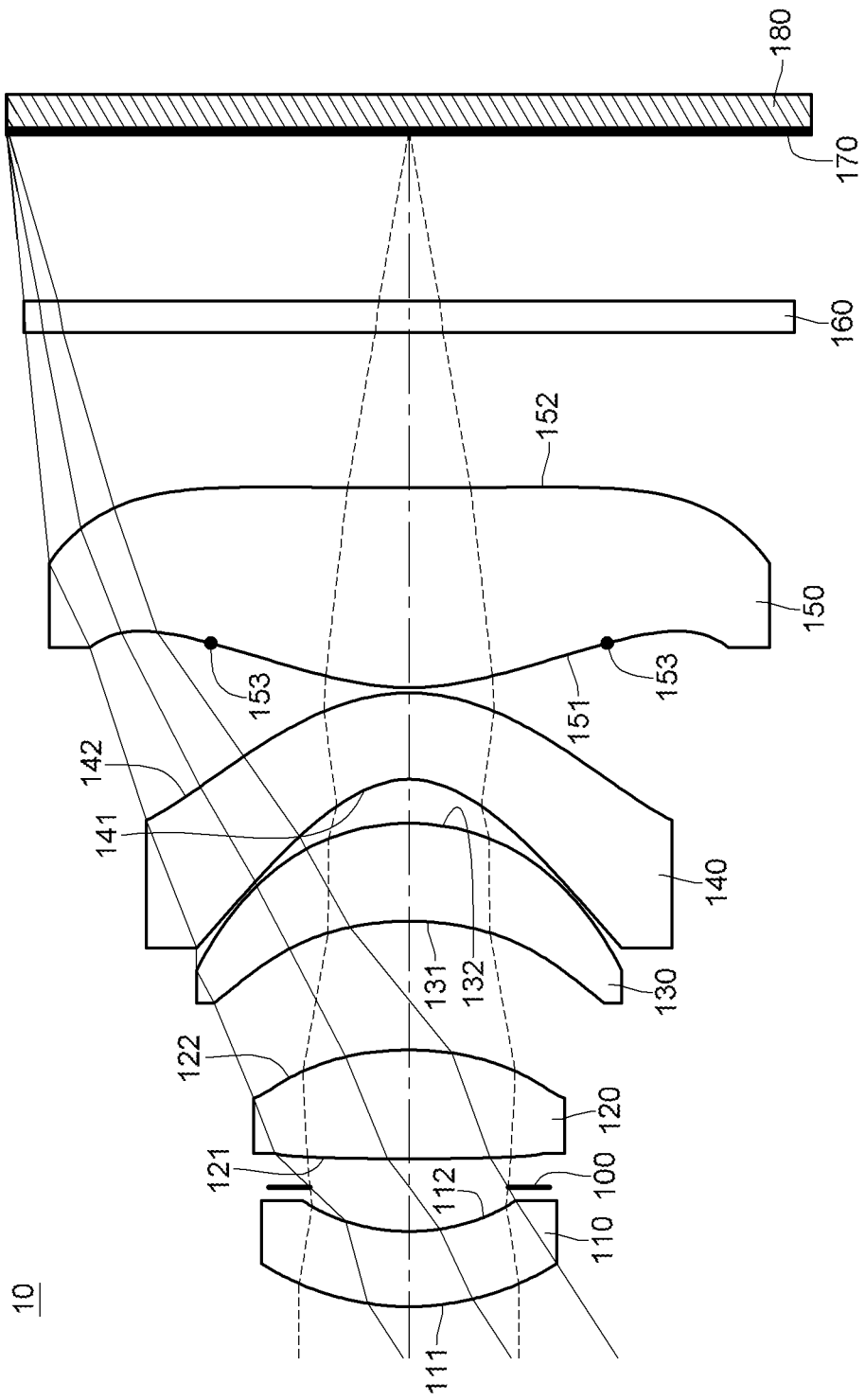
FIG. 1A is a schematic structural view of a first embodiment of a photographing optical lens assembly.

The photographing optical lens assembly of the present disclosure is described with FIG. 1A as an example to illustrate that the embodiments have similar lens combinations, configuration relationships, and the same conditions of the optical lens assembly. The differences are described in detail in the following embodiments other than the embodiment described in FIG. 1.

Taking FIG. 1A as an example, the photographing optical lens assembly 10 comprises, from an object side to an image side along an optical axis (from left to right in FIG. 1A) in sequence, a stop, a first lens element 110, a second lens element 120, a third lens element 130, a fourth lens element 140, a fifth lens element 150, an infrared cut filter 160 and an image sensor 180 disposed on an image plane 170. In this embodiment, the stop is, for example, an aperture stop 100.

The first lens element 110 comprises an object-side surface 111 and an image-side surface 112. The refractive power of the first lens element 110 is positive and the object-side surface 111 is convex for expanding the field of view of the photographing optical lens assembly 10 and lowering the aberration caused by the first lens element 110. Therefore, a balance between expanding the field of view and correcting the aberration is achieved.

The second lens element 120 comprises an object-side surface 121 and an image-side surface 122. The refractive power of the second lens element 120 is positive for providing a major part of the total refractive power needed by the photographing optical lens assembly 10, and therefore, reducing the total optical length of the photographing optical lens assembly 10

The third lens element 130 comprises an object-side surface 131 and an image-side surface 132. The refractive power of the third lens element 130 is positive for lowering the sensitivity of the refractive power of the photographing optical lens assembly 10. In addition, when the object-side surface 131 is concave and the image-side surface 132 is convex, the aberration of the photographing optical lens assembly 10 is corrected and the image quality is improved.

The fourth lens element 140 comprises an object-side surface 141 and an image-side surface 142. The refractive power of the fourth lens element 140 is negative for correcting the chromatism of the photographing optical lens assembly 10. In addition, the object-side surface 141 is concave and the image-side surface 142 is convex for correcting the high order aberration of the photographing optical lens assembly 10 and improving the image quality.

The fifth lens element 150 comprises an object-side surface 151 and an image-side surface 152, and the fifth lens element 150 also has positive refractive as well as the third lens element 130. In addition, it is favorable to enhance the refractive power arrangement of the fifth lens element 150 when the object-side surface 151 is convex. It is favorable to increase the axial distance between a principle point of the photographing optical lens assembly 10 and the image plane 170 for shortening the total optical length of the photographing optical lens assembly 10 and the miniaturization of the photographing optical lens assembly 10 when the image-side surface 152 is concave. At least one of the object-side surface 151 and the image-side surface 152 is aspheric for correcting the aberration of the photographing optical lens assembly 10 and shortening the total optical length of the photographing optical lens assembly 10. On the other hand, the fifth lens element 150 further comprises at least one inflection point 153 for reducing the angle of incidence on the image plane 170, and, therefore, correcting the off-axis aberrations.

The photographing optical lens assembly 10 satisfies the following conditions:

$$0.75 < SD/TD < 1.1; \quad \text{(Condition 1)}$$

$$0.75 < f/f_2 < 1.7; \text{ and} \quad \text{(Condition 2)}$$

$$0.1 < T_{12}/T_{23} < 4.0; \quad \text{(Condition 3)}$$

Wherein T12 is the axial distance between the first lens element 110 and the second lens element 120; T23 is the axial distance between the second lens element 120 and the third lens element 130; SD is the axial distance between the stop 100 and the image-side surface 152 of the fifth lens element 150; TD is the axial distance between the object-side surface 111 of the first lens element 110 and the image-side 152 of the fifth lens element 150; f is the focal length of the photographing optical lens assembly 10; f2 is the focal length of the second lens element 120.

When Condition 1 is satisfied, a balance between a telecentric effect and a wide field of view effect is achieved. When Condition 2 is satisfied, the refractive power of the second lens element 120 is favorable for shortening the total optical length of the photographing optical lens assembly 10 and the miniaturization of the photographing optical lens assembly 10. In some embodiments, the photographing optical lens assembly 10 satisfies the condition: $0.9<f/f_2<1.4$.

When Condition 3 is satisfied, the axial distances between the second lens element 120 and the first lens element 110 and between the second lens element 120 and the third lens element 130 are favorable for reducing the angle of incidence on the image plane 170, and, therefore, correcting the off-axis aberrations. In some embodiments, the photographing optical lens assembly 10 satisfies the condition: $0.1<T_{12}/T_{23}<1.5$.

In this and some embodiments, the photographing optical lens assembly 10 further satisfies following conditions:

$20<V_2-V_4<70$; (condition 4):

$0.1<f_2/f_3<0.8$; (condition 5):

$0.10<ET_{34}/T_{34}<0.85$; (condition 6):

$-0.6<R_8/f<0$; and (condition 7):

$25°<HFOV<38°$; (condition 8):

wherein $V_2$ is the Abbe number of the second lens element 120; $V_4$ is the Abbe number of the fourth lens element 140; $f_2$ is the focal length of the second lens element 120; $f_3$ is the focal length of the third lens element 130. $T_{34}$ is the axial distance between the third lens element 130 and the fourth lens element 140; $R_8$ is the curvature radius of the image-side surface 142 of the fourth lens element 140; f is the focal length of the photographing optical lens assembly 10; HFOV is half of maximal field of view in the photographing optical lens assembly 10; $ET_{34}$ is the horizontal air distance between the points of each maximal effective diameter of the third lens element 130 and the fourth lens element 140.

When Condition 4 is satisfied, the chromatism of the photographing optical lens assembly 10 is corrected. When Condition 5 is satisfied, the arrangement of the refractive power of the photographing optical lens assembly 10 is favorable for lowering the sensitivity of the refractive power of the photographing optical lens assembly 10. When Condition 6 is satisfied, the axial distance between the third lens element 130 and the fourth lens element 140 is favorable for shortening the total optical length of the photographing optical lens assembly 10 and the assembly of the photographing optical lens assembly 10. Satisfaction of Condition 7 is favorable for the correction of the aberration of the photographing optical lens assembly 10. When Condition 8 is satisfied, the photographing optical lens assembly 10 has a well-adjusted field of view.

In order to reduce the manufacturing costs, the fifth lens element 150 may be made of plastic. In addition, at least one of the object-side surface 151 and the image-side surface 152 is aspheric. Aspheric profiles allow more design-parameter freedom for the aberration correction so the total optical length of the photographing optical lens assembly 10 can be shortened effectively.

In addition, in the photographing optical lens assembly 10, a convex surface means the surface at a paraxial site is convex; a concave surface means a surface at a paraxial site is concave.

Furthermore, for eliminating the stray light to improve the image quality or limiting the object image to a desirable size, at least one stop, such as a glare stop or field stop, may be disposed in the photographing optical lens assembly 10.

As for the optical lens assembly 10, the specific schemes are further described with the following embodiments. Parameters in the embodiments are defined as follows. Fno is an f-number value of the photographing optical lens assembly 10. The aspheric surface in the embodiments may be represented by, but not limited to, the following aspheric surface equation (Condition ASP):

$$X(Y) = (Y^2/R)/(1 + sqrt(1-(1+k)*(Y/R)^2)) + \sum_i (Ai)*(Y^i)$$

Wherein Y is the distance from the point on the curve of the aspheric surface to the optical axis, X is the distance of a point on the aspheric surface at a distance Y from the optical axis relative to the tangential plane at the aspheric surface vertex, R is a curvature radius, k is a conic factor, Ai is an $i^{th}$ order aspheric surface coefficient, and in the embodiments, i may be, but is not limited to, 4, 6, 8, 10, 12 and 14.

The First Embodiment (Embodiment 1)

FIG. 1A is a schematic structural view of the first embodiment of the photographing optical lens assembly. The photographing optical lens assembly 10 comprises, from an object side to an image side along an optical axis (from left to right in FIG. 1A) in sequence, the first lens element 110, the stop, the second lens element 120, the third lens element 130, the fourth lens element 140, the fifth lens element 150, the infrared cut filter 160 and the image sensor 180 disposed on the image plane 170. In this embodiment, the stop is, for example, the aperture stop 100. Additionally in this embodiment, light having the reference wavelength of 587.6 nm is projected on the photographing optical lens assembly 10.

In this embodiment, the first lens element 110 with negative refractive power has a convex object-side surface 111 and a concave image-side surface 112. The second lens element 120 with positive refractive power has a convex object-side surface 121 and a convex image-side surface 122. The third lens element 130 with positive refractive power has a concave object-side surface 131 and a convex image-side surface 132. The fourth lens element 140 with negative refractive power has a concave object-side surface 141 and a convex image-side surface 142. The fifth lens element 150 with positive refractive power has a convex object-side surface 151 and a concave image-side surface 152. The fifth lens element 150 comprises at least one inflection point 153.

The detailed data of the photographing optical lens assembly 10 is as shown in Table 1-1 below:

TABLE 1-1

Embodiment 1
f = 6.03, Fno = 2.85, HFOV = 33.0 deg.

| Surface # | | Curvature radius(mm) | Thickness (mm) | Material | Index | Abbe # | Focal length (mm) |
|---|---|---|---|---|---|---|---|
| 0 | Object | Plano | Infinity | | | | |
| 1 | Lens 1 | 2.617580(ASP) | 0.724 | Plastic | 1.640 | 23.3 | −23.84 |

TABLE 1-1-continued

Embodiment 1
f = 6.03, Fno = 2.85, HFOV = 33.0 deg.

| Surface # | | Curvature radius(mm) | Thickness (mm) | Material | Index | Abbe # | Focal length (mm) |
|---|---|---|---|---|---|---|---|
| 2 | | 1.993080(ASP) | 0.422 | | | | |
| 3 | Ape. Stop | Plano | 0.275 | | | | |
| 4 | Lens 2 | 14.759000(ASP) | 1.053 | Plastic | 1.544 | 55.9 | 4.66 |
| 5 | | −2.981840(ASP) | 1.243 | | | | |
| 6 | Lens 3 | −2.919780(ASP) | 0.944 | Plastic | 1.544 | 55.9 | 10.11 |
| 7 | | −2.124830(ASP) | 0.424 | | | | |
| 8 | Lens 4 | −0.839610(ASP) | 0.834 | Plastic | 1.640 | 23.3 | −3.59 |
| 9 | | −1.834840(ASP) | 0.050 | | | | |
| 10 | Lens 5 | 2.411860(ASP) | 1.928 | Plastic | 1.544 | 55.9 | 4.51 |
| 11 | | 100.000000(ASP) | 1.500 | | | | |
| 12 | IR-cut filter | Plano | 0.300 | Glass | 1.516 | 64.1 | — |
| 13 | | Plano | 1.605 | | | | |
| 14 | Image Plane | Plano | — | | | | |

Note:
Reference wavelength is d-line 587.6 nm

In Table 1-1, from the object-side surface 111 to the image-side surface 152, all the surfaces can be aspheric, and the aspheric surfaces can satisfy Condition ASP, but are not limited thereto. As for the parameters of the aspheric surfaces, reference is made to Table 1-2 below:

TABLE 1-2

Aspheric Coefficients

| | Surface # | | | | |
|---|---|---|---|---|---|
| | 1 | 2 | 4 | 5 | 6 |
| k | 1.61285E−01 | 1.66424E+00 | 1.00000E+00 | 5.30031E−01 | 1.00000E+00 |
| A4 | −2.61088E−03 | −1.94080E−02 | −1.21692E−02 | −1.70007E−02 | −1.18120E−02 |
| A6 | −1.83808E−03 | −2.63893E−02 | −6.68325E−03 | −3.46820E−03 | 5.78436E−04 |
| A8 | 9.32589E−04 | 2.20631E−02 | 6.07931E−03 | 1.40178E−03 | 1.46097E−04 |
| A10 | −1.04847E−04 | −1.44201E−02 | 2.05031E−03 | 7.26463E−04 | 3.01165E−04 |
| A12 | — | — | −5.56801E−04 | −1.03741E−03 | — |
| A14 | — | — | — | 4.82007E−04 | — |

| | Surface # | | | | |
|---|---|---|---|---|---|
| | 7 | 8 | 9 | 10 | 11 |
| k | −1.29680E−01 | −1.94038E+00 | −1.03124E+00 | −7.99668E+00 | 1.00000E+00 |
| A4 | −6.51458E−03 | −4.17311E−02 | 1.29493E−02 | −1.44825E−03 | −2.42410E−04 |
| A6 | −1.11677E−03 | 1.02770E−02 | −1.09269E−03 | 2.84688E−04 | −2.97970E−04 |
| A8 | 3.46096E−04 | −8.03140E−04 | 2.04488E−04 | −1.70285E−04 | −4.50988E−05 |
| A10 | 3.58696E−05 | — | 5.88300E−06 | 1.93972E−05 | 5.78107E−06 |
| A12 | — | — | −4.18823E−06 | −9.73145E−07 | −2.45328E−07 |
| A14 | — | — | 2.90076E−07 | — | — |

In Table 1-1, the curvature radius, the thickness and the focal length are shown in millimeters (mm). Surface numbers 0-14 represent the surfaces sequentially arranged from the object-side to the image-side along the optical axis. "f" stands for the focal length, "Fno" is the f-number, and "HFOV" is half of maximal field of view of this embodiment. In Table 1-2, k represents the conic coefficient of the equation of the aspheric surface profiles. A1-A14 represent the aspheric coefficients ranging from the 1st order to the $16^{th}$ order. All labels for Tables of the remaining embodiments share the same definitions as those in Table 1-1 and Table 1-2 of the first embodiment, and their definitions will not be stated again.

The content of Table 1-3 may be deduced from Table 1-1:

TABLE 1-3

| Embodiment 1 | |
|---|---|
| f (mm) | 6.03 |
| Fno | 2.85 |
| HFOV (deg.) | 33.0 |
| $V_2 - V_4$ | 32.6 |
| $T_{12}/T_{23}$ | 0.56 |
| $ET_{34}/T_{34}$ | 0.51 |

TABLE 1-3-continued

| Embodiment 1 | |
|---|---|
| $R_8/f$ | −0.30 |
| $f/f_2$ | 1.30 |
| $f_2/f_3$ | 0.46 |
| SD/TD | 0.85 |

It can be observed from Table 1-3 that SD/TD equals 0.85 which satisfies Condition 1; $f/f_2$ equals 1.30 which satisfies Condition 2; $T_{12}/T_{23}$ equals 0.56 which satisfies Condition 3; $V_2−V_4$ equals 32.6 which satisfies Condition 4.

$f_2/f_3$ equals 0.46 which satisfies Condition 5; $ET_{34}/T_{34}$ equals 0.51 which satisfies Condition 6; $R_8/f$ equals −0.30 which satisfies Condition 7; HFOV equals 33.0° which satisfies Condition 8.

FIG. 1B is a graph of longitudinal spherical aberration curves when the lights having wavelengths of 486.1 nm (L), 587.6 nm (M), and 656.3 nm (N) are respectively projected in the photographing optical lens assembly 10 in FIG. 1A. Horizontal axis is the focus position (millimeter, mm), and vertical axis is the normalized entrance pupil or aperture value. From FIG. 1B, the corresponding longitudinal spherical aberrations generated by the photographing optical lens assembly 10 are shown within a range of −0.01 mm to 0.05 mm.

In the second embodiment to the tenth embodiment and the graphs of the longitudinal spherical aberration curves in FIGS. 2B, 3B, 4B, 5B and 6B, their labeling scheme shares many similarities hence it will not be repeated herein for conciseness.

FIG. 1C is a graph of astigmatic field curves from a tangential plane (T) and a sagittal plane (S). Horizontal axis is the focus position (mm), and vertical axis is the image height (mm). From FIG. 1C, the astigmatic field curvature of the tangential plane is within a range of −0.04 mm to 0.04 mm, and the astigmatic field curvature of the sagittal plane is within a range of −0.05 mm to 0.01 mm.

In the second embodiment to the tenth embodiment and the graphs of the astigmatic field curves in FIGS. 2C, 3C, 4C, 5C and 6C, their labeling scheme shares many similarities hence it will not be repeated herein for conciseness.

FIG. 1D is a graph of a distortion curve in the photographing optical lens assembly 10 in FIG. 1A. The horizontal axis is the distortion ratio (%), and the vertical axis is the image height (mm). It can be observed from FIG. 1D that the distortion ratio corresponding to the light having wavelength of 587.6 nm is within a range of −1.5% to 0.5%. As shown in FIGS. 1B to 1D, the photographing optical lens assembly 10, designed according to the first embodiment, is capable of effectively correcting various aberrations.

In the second embodiment to the tenth embodiment and the graph of the distortion curves in FIGS. 2D, 3D, 4D, 5D and 6D, the solid line G indicates the distortion curve of the light having the wavelength of 587.6 nm, which will not be repeated herein for conciseness.

It should be noted that the distortion curves and the astigmatic field curves of the wavelength of 486.1 nm and 656.3 nm are highly similar to the distortion curve and the astigmatic field curves of the wavelength of 587.6 nm. In order to prevent the confusion of reading the curves in FIGS. 1C and 1D, the distortion curve and the astigmatic field curves of wavelengths of 486.1 nm and 656.3 nm are not shown in FIGS. 1C and 1D, and the same applies throughout the rest of the embodiments of this present disclosure.

The Second Embodiment (Embodiment 2)

Figure 2A:
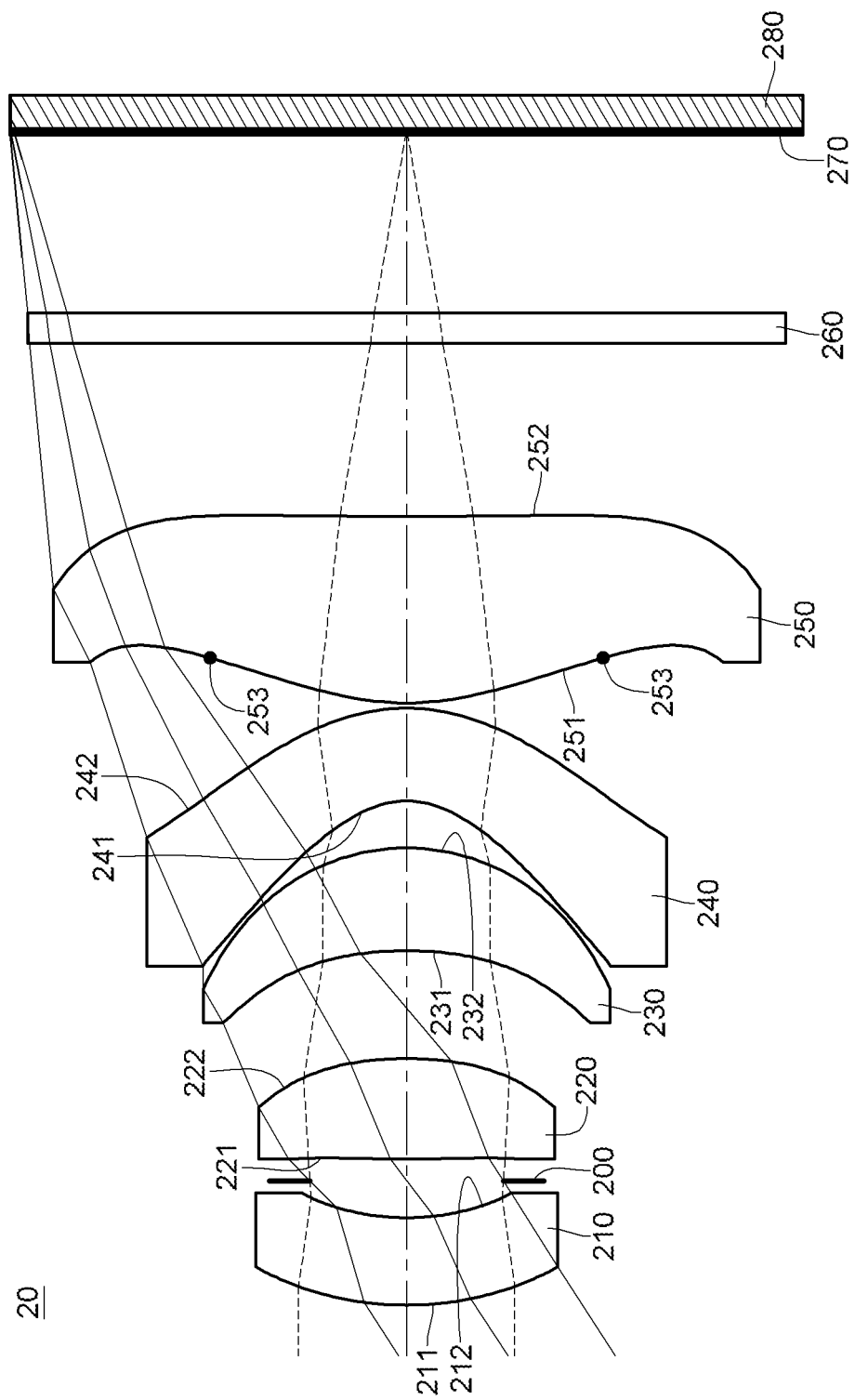
FIG. 2A is a schematic structural view of a second embodiment of a photographing optical lens assembly.

FIG. 2A is a schematic structural view of the second embodiment of the photographing optical lens assembly. The specific implementation and elements of the second embodiment are substantially the same as those in the first embodiment. The element symbols in the second embodiment all begin with "2" which correspond to those in the first embodiment with the same function or structure. For conciseness, only the differences are illustrated below, and the similarities will not be repeated herein.

In this embodiment, for example, the reference wavelength of the light received by the photographing optical lens assembly 20 is 587.6 nm.

In this embodiment, a first lens element 210 with negative refractive power comprises a convex object-side surface and a concave image-side surface 211. A second lens element 220 with positive refractive power comprises convex object-side surface 221 and a convex image-side surface 222. A third lens element 230 with positive refractive power comprises a concave object-side surface 231 and a convex image-side surface 232. A fourth lens element 240 with negative refractive power comprises a concave object-side surface 241 and a convex image-side surface 242. A fifth lens element 250 with positive refractive power comprises a convex object-side surface 251, a concave image-side surface 252 and at least one inflection point 253.

The detailed data of the photographing optical lens assembly 20 is as shown in Table 2-1 below:

TABLE 2-1

Embodiment 2
f = 6.03, Fno = 2.85, HFOV = 33.0 deg.

| Surface # | | Curvature radius(mm) | Thickness (mm) | Material | Index | Abbe # | Focal length (mm) |
|---|---|---|---|---|---|---|---|
| 0 | Object | Plano | Infinity | | | | |
| 1 | Lens 1 | 3.168110(ASP) | 0.859 | Plastic | 1.640 | 23.3 | −28.41 |
| 2 | | 2.412420(ASP) | 0.364 | | | | |
| 3 | Ape. Stop | Plano | 0.214 | | | | |
| 4 | Lens 2 | 16.446000(ASP) | 0.986 | Plastic | 1.544 | 55.9 | 5.25 |
| 5 | | −3.381500(ASP) | 1.059 | | | | |
| 6 | Lens 3 | −3.514500(ASP) | 1.008 | Plastic | 1.544 | 55.9 | 7.51 |
| 7 | | −2.080880(ASP) | 0.463 | | | | |
| 8 | Lens 4 | −0.829740(ASP) | 0.911 | Plastic | 1.640 | 23.3 | −3.49 |
| 9 | | −1.885360(ASP) | 0.050 | | | | |

TABLE 2-1-continued

Embodiment 2
f = 6.03, Fno = 2.85, HFOV = 33.0 deg.

| Surface # | | Curvature radius(mm) | Thickness (mm) | Material | Index | Abbe # | Focal length (mm) |
|---|---|---|---|---|---|---|---|
| 10 | Lens 5 | 2.488050(ASP) | 1.835 | Plastic | 1.544 | 55.9 | 4.66 |
| 11 | | 100.000000(ASP) | 1.700 | | | | |
| 12 | IR-cut filter | Plano | 0.300 | Glass | 1.516 | 64.1 | — |
| 13 | | Plano | 1.745 | | | | |
| 14 | Image Plane | Plano | — | | | | |

Note:
Reference wavelength is d-line 587.6 nm

In Table 2-1, from the object-side surface 211 to the image-side surface 252, all the surfaces can be aspheric, and the aspheric surfaces can satisfy Condition ASP, but are not limited thereto. As for the parameters of the aspheric surfaces, reference is made to Table 2-2 below.

TABLE 2-2

Aspheric Coefficients

| | Surface # | | | | |
|---|---|---|---|---|---|
| | 1 | 2 | 4 | 5 | 6 |
| k | 3.68955E−01 | 2.91966E+00 | −5.17295E+01 | 1.00000E+00 | 1.00000E+00 |
| A4 | −1.11117E−03 | −1.84047E−02 | −1.83752E−02 | −2.44173E−02 | −1.69985E−02 |
| A6 | −5.58797E−04 | −2.48909E−02 | −1.05604E−02 | −3.58852E−03 | −6.23922E−04 |
| A8 | 4.30973E−04 | 2.09675E−02 | 6.57801E−03 | 2.85837E−04 | −5.26599E−04 |
| A10 | 2.92763E−05 | −1.38501E−02 | −2.72368E−04 | −2.57130E−04 | 2.60380E−04 |
| A12 | — | — | −5.56801E−04 | −2.20935E−06 | — |
| A14 | — | — | — | 7.06190E−05 | — |

| | Surface # | | | | |
|---|---|---|---|---|---|
| | 7 | 8 | 9 | 10 | 11 |
| k | −2.01092E−01 | −1.85204E+00 | −9.82221E−01 | −7.46359E+00 | 1.00000E+00 |
| A4 | −3.55014E−03 | −4.04515E−02 | 1.20640E−02 | −1.03691E−03 | 9.27060E−04 |
| A6 | −1.32961E−03 | 9.97271E−03 | −1.12264E−03 | 2.77276E−04 | −4.32230E−04 |
| A8 | 1.80508E−04 | −8.03283E−04 | 2.01653E−04 | −1.73485E−04 | −4.30777E−05 |
| A10 | −2.76032E−05 | — | 9.03066E−06 | 1.94778E−05 | 6.32881E−06 |
| A12 | — | — | −3.64227E−06 | −9.55273E−07 | −2.80552E−07 |
| A14 | — | — | 1.61756E−07 | — | — |

The content of Table 2-3 may be deduced from Table 2-1.

TABLE 2-3

| Embodiment 2 | |
|---|---|
| f (mm) | 6.03 |
| Fno | 2.85 |
| HFOV (deg.) | 33.0 |
| $V_2 - V_4$ | 32.6 |
| $T_{12}/T_{23}$ | 0.55 |
| $ET_{34}/T_{34}$ | 0.48 |
| $R_8/f$ | −0.31 |
| $f/f_2$ | 1.15 |
| $f_2/f_3$ | 0.70 |
| SD/TD | 0.84 |

FIG. 2B is a graph of longitudinal spherical aberration curves when the lights having wavelengths of 486.1 nm (L), 587.6 nm (M), and 656.3 nm (N) are projected in the photographing optical lens assembly 20 in FIG. 2A. From FIG. 2B, the corresponding longitudinal spherical aberrations generated by the photographing optical lens assembly 20 are shown within a range of −0.02 mm to 0.05 mm.

FIG. 2C is a graph of astigmatic field curves from a tangential plane (T) and a sagittal plane (S). From FIG. 2C, the astigmatic field curvature of the tangential plane is within a range of 0 mm to 0.04 mm, and the astigmatic field curvature of the sagittal plane is within a range of −0.05 mm to 0.01 mm.

FIG. 2D is a graph of a distortion curve in the photographing optical lens assembly 20 in FIG. 2A. It can be observed from FIG. 2D that the distortion ratio is within a range of −1.5% to 0.5%. As shown in FIGS. 2B to 2D, the photographing optical lens assembly 20, designed according to the second embodiment, is capable of effectively correcting various aberrations.

The Third Embodiment (Embodiment 3)

Figure 3A:
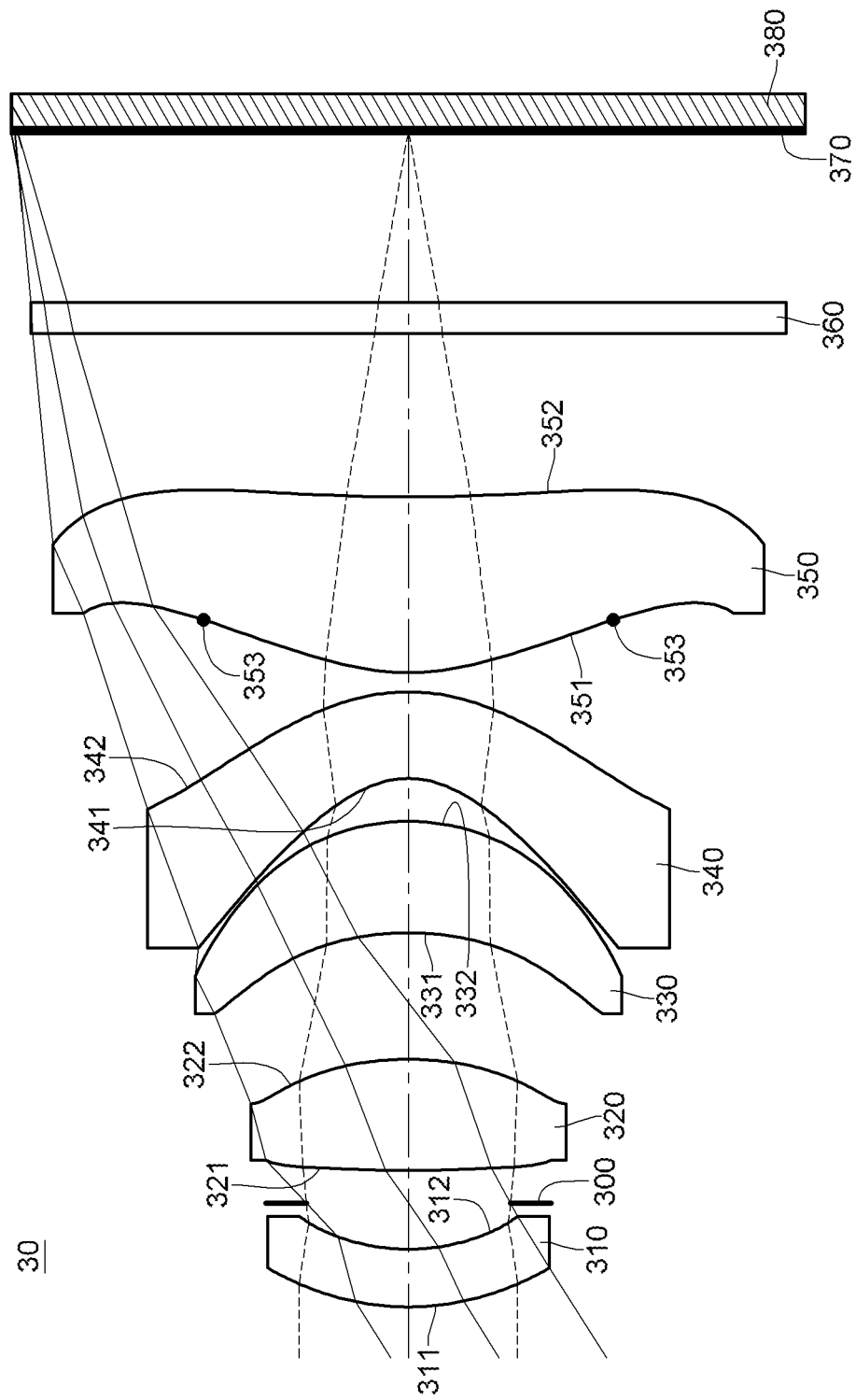
FIG. 3A is a schematic structural view of a third embodiment of an photographing optical lens assembly.

FIG. 3A is a schematic structural view of the third embodiment of the photographing optical lens assembly. The specific implementation and elements of the third embodiment are substantially the same as those in the first embodiment. The element symbols in the third embodiment all begin with "3" which correspond to those in the first embodiment with the same function or structure. For conciseness, only the differences are illustrated below, and the similarities will not be repeated herein.

In this embodiment, for example, the reference wavelength of the light received by the photographing optical lens assembly 30 is 587.6 nm.

In this embodiment, a first lens element 310 with negative refractive power comprises a convex object-side surface 311 and a concave image-side surface 312. A second lens element 320 with positive refractive power comprises a convex object-side surface 321 and a convex image-side surface 322. A third lens element 330 with positive refractive power comprises a concave object-side surface 331 and a convex image-side surface 332. A fourth lens element 340 with negative refractive power comprises a concave object-side surface 341 and a convex image-side surface 342. A fifth lens element 350 with positive refractive power comprises a convex object-side surface 351, a concave image-side surface 352 and at least one inflection point 353.

The detailed data of the photographing optical lens assembly 30 is as shown in Table 3-1 below.

TABLE 3-1

Embodiment 3
f = 6.20, Fno = 2.90, HFOV = 32.3 deg.

| Surface # | | Curvature radius(mm) | Thickness (mm) | Material | Index | Abbe # | Focal length (mm) |
|---|---|---|---|---|---|---|---|
| 0 | Object | Plano | Infinity | | | | |
| 1 | Lens 1 | 2.589700(ASP) | 0.564 | Plastic | 1.569 | 71.3 | −24.78 |
| 2 | | 2.015030(ASP) | 0.449 | | | | |
| 3 | Ape. Stop | Plano | 0.322 | | | | |
| 4 | Lens 2 | 12.361100(ASP) | 1.086 | Plastic | 1.544 | 55.9 | 4.64 |
| 5 | | −3.072700(ASP) | 1.237 | | | | |
| 6 | Lens 3 | −2.925200(ASP) | 1.089 | Plastic | 1.544 | 55.9 | 9.85 |
| 7 | | −2.140580(ASP) | 0.421 | | | | |
| 8 | Lens 4 | −0.857370(ASP) | 0.846 | Plastic | 1.640 | 23.3 | −3.52 |
| 9 | | −1.915960(ASP) | 0.187 | | | | |
| 10 | Lens 5 | 2.286040(ASP) | 1.718 | Plastic | 1.544 | 55.9 | 4.69 |
| 11 | | 16.103100(ASP) | 1.600 | | | | |
| 12 | IR-cut filter | Plano | 0.300 | Glass | 1.516 | 64.1 | — |
| 13 | | Plano | 1.651 | | | | |
| 14 | Image Plane | Plano | — | | | | |

Note:
Reference wavelength is d-line 587.6 nm

In Table 3-1, from the object-side surface 311 to the image-side surface 352, all surfaces can be aspheric, and the aspheric surfaces can satisfy Condition ASP, but are not limited thereto. As for the parameters of the aspheric surfaces, reference is made to Table 3-2 below.

TABLE 3-2

Aspheric Coefficients

| | Surface # | | | | |
|---|---|---|---|---|---|
| | 1 | 2 | 4 | 5 | 6 |
| k | 4.51369E−02 | 1.69345E+00 | 1.00000E+00 | 3.98751E−01 | 9.81615E−01 |
| A4 | −3.67124E−03 | −1.99390E−02 | −1.00541E−02 | −1.52415E−02 | −1.11877E−02 |
| A6 | −1.57425E−03 | −2.78258E−02 | −5.98049E−03 | −3.73591E−03 | 5.18544E−04 |
| A8 | 8.34654E−04 | 2.24431E−02 | 5.28213E−03 | 1.69638E−03 | 1.69243E−04 |
| A10 | −4.41915E−05 | −1.46176E−02 | 2.16357E−03 | 9.20851E−04 | 2.85586E−04 |
| A12 | — | — | −6.37017E−04 | −1.03587E−03 | — |
| A14 | — | — | — | 4.46123E−04 | — |

| | Surface # | | | | |
|---|---|---|---|---|---|
| | 7 | 8 | 9 | 10 | 11 |
| k | −1.43769E−01 | −1.95542E+00 | −1.05335E+00 | −6.21581E+00 | −6.94168E+01 |
| A4 | −8.46543E−03 | −4.38015E−02 | 1.32906E−02 | −1.52115E−03 | −1.17116E−03 |
| A6 | −1.12277E−03 | 1.02017E−02 | −1.09613E−03 | 4.08234E−04 | −1.25816E−04 |
| A8 | 3.20316E−04 | −8.09905E−04 | 2.07161E−04 | −1.70656E−04 | −4.42654E−05 |
| A10 | 2.46112E−05 | — | 6.54332E−06 | 1.94710E−05 | 5.45171E−06 |
| A12 | — | — | −4.40947E−06 | −9.20358E−07 | −2.49597E−07 |
| A14 | — | — | 2.85987E−07 | — | — |

The content of Table 3-3 may be deduced from Table 3-1.

TABLE 3-3

| Embodiment 3 | |
|---|---|
| f (mm) | 6.20 |
| Fno | 2.90 |
| HFOV (deg.) | 32.3 |
| $V_2 - V_4$ | 32.6 |
| $T_{12}/T_{23}$ | 0.62 |
| $ET_{34}/T_{34}$ | 0.65 |
| $R_8/f$ | −0.31 |
| $f/f_2$ | 1.34 |
| $f_2/f_3$ | 0.47 |
| SD/TD | 0.87 |

FIG. 3B is a graph of longitudinal spherical aberration curves when the lights having wavelengths of 486.1 nm (L), 587.6 nm (M), and 656.3 nm (N) are projected in the photographing optical lens assembly 30 in FIG. 3A. From FIG. 3B, the corresponding longitudinal spherical aberrations generated by the photographing optical lens assembly 30 are shown within a range of −0.10 mm to 0.05 mm.

FIG. 3C is a graph of astigmatic field curves from a tangential plane (T) and a sagittal plane (S). From FIG. 3C, the astigmatic field curvature of the tangential plane is within a range of −0.05 mm to 0.01 mm, and the astigmatic field curvature of the sagittal plane is within a range of −0.075 mm to 0 mm.

FIG. 3D is a graph of a distortion curve in the photographing optical lens assembly 30 in FIG. 3A. It can be observed from FIG. 3D that the distortion ratio is within a range of −1.5% to 0%. As shown in FIGS. 3B to 3D, the photographing optical lens assembly 30, designed according to the third embodiment, is capable of effectively correcting various aberrations.

The Fourth Embodiment (Embodiment 4)

Figure 4A:
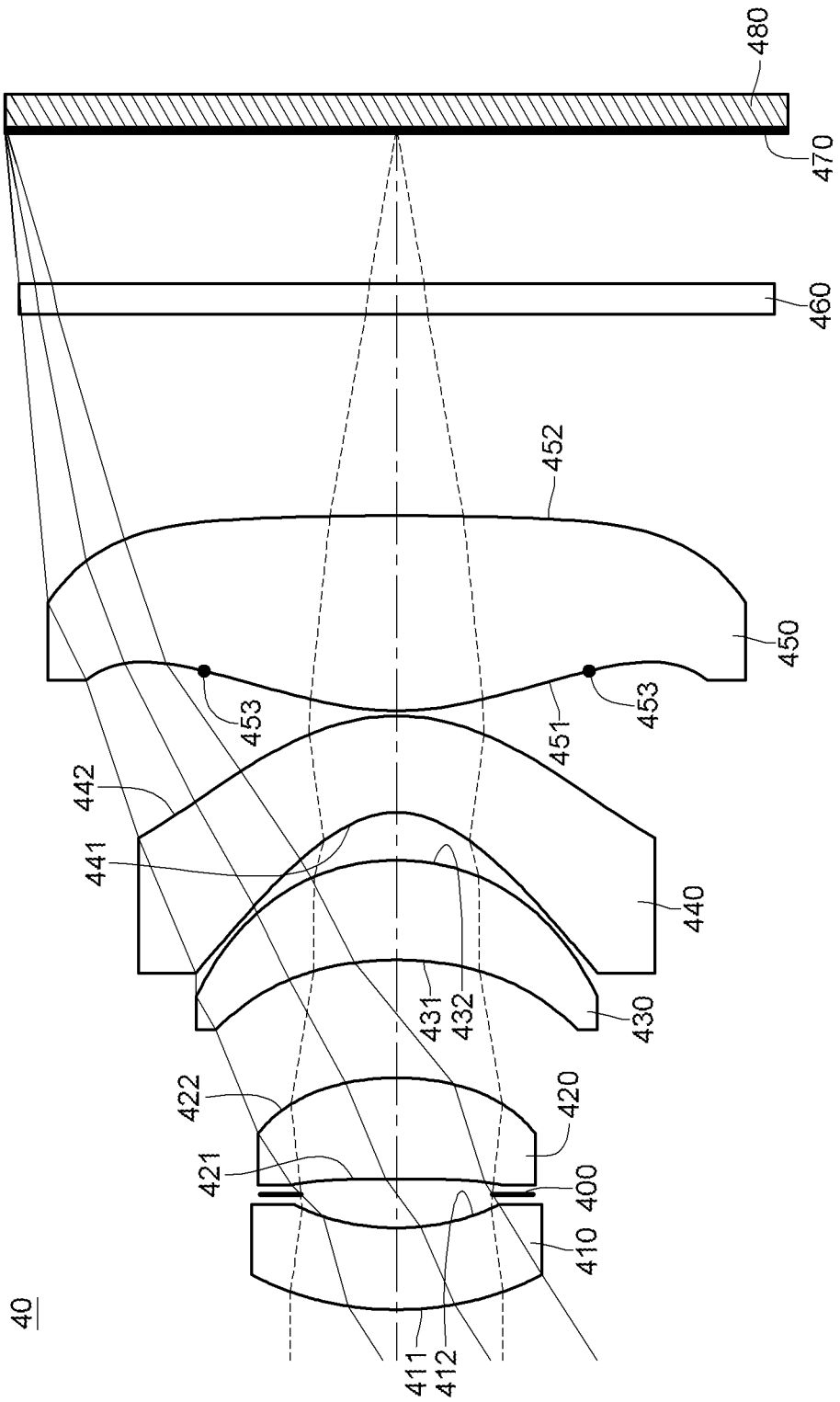
FIG. 4A is a schematic structural view of a fourth embodiment of a photographing optical lens assembly.

FIG. 4A is a schematic structural view of the fourth embodiment of the photographing optical lens assembly. The specific implementation and elements of the fourth embodiment are substantially the same as those in the first embodiment. The element symbols in the fourth embodiment all begin with "4" which correspond to those in the first embodiment with the same function or structure. For conciseness, only the differences are illustrated below, and the similarities will not be repeated herein.

In this embodiment, for example, the reference wavelength of the light received by the photographing optical lens assembly 40 is 587.6 nm.

In this embodiment, a first lens element 410 with negative refractive power comprises a convex object-side surface 411 and a concave image-side surface 412. A second lens element 420 with positive refractive power comprises convex image-side surface 421 and a convex object-side surface 422. A third lens element 430 with positive refractive power comprises a concave object-side surface 431 and a convex image-side surface 432. A fourth lens element 440 with negative refractive power comprises a concave object-side surface 441 and a convex image-side surface 442. A fifth lens element 450 with positive refractive power comprises a convex object-side surface 451, a convex image-side surface 452 and at least one inflection point 453.

The detailed data of the photographing optical lens assembly 40 is as shown in Table 4-1 below.

TABLE 4-1

Embodiment 4
f = 6.04, Fno = 2.87, HFOV = 32.7 deg.

| Surface # | | Curvature radius(mm) | Thickness (mm) | Material | Index | Abbe # | Focal length (mm) |
|---|---|---|---|---|---|---|---|
| 0 | Object | Plano | Infinity | | | | |
| 1 | Lens 1 | 3.261100(ASP) | 0.813 | Plastic | 1.640 | 23.3 | −27.72 |
| 2 | | 2.486670(ASP) | 0.334 | | | | |
| 3 | Ape. Stop | Plano | 0.150 | | | | |
| 4 | Lens 2 | −47.393400(ASP) | 1.006 | Plastic | 1.544 | 55.9 | 5.02 |
| 5 | | −2.600180(ASP) | 1.170 | | | | |
| 6 | Lens 3 | −3.382000(ASP) | 0.992 | Plastic | 1.544 | 55.9 | 8.26 |
| 7 | | −2.129630(ASP) | 0.475 | | | | |
| 8 | Lens 4 | −0.843340(ASP) | 0.959 | Plastic | 1.634 | 23.8 | −3.49 |
| 9 | | −1.963920(ASP) | 0.050 | | | | |
| 10 | Lens 5 | 2.719170(ASP) | 1.939 | Plastic | 1.544 | 55.9 | 4.68 |
| 11 | | −29.696400(ASP) | 2.000 | | | | |
| 12 | IR-cut filter | Plano | 0.300 | Glass | 1.516 | 64.1 | — |
| 13 | | Plano | 1.494 | | | | |
| 14 | Image Plane | Plano | — | | | | |

Note:
Reference wavelength is d-line 587.6 nm

In Table 4-1, from the object-side surface 411 to the image-side surface 452, all surfaces can be aspheric, and the aspheric surfaces can satisfy Condition ASP, but are not limited thereto. As for the parameters of the aspheric surfaces, reference is made to Table 4-2 below.

TABLE 4-2

Aspheric Coefficients

| | Surface # | | | | |
|---|---|---|---|---|---|
| | 1 | 2 | 4 | 5 | 6 |
| k | 5.23110E−01 | 3.17690E+00 | −9.00000E+01 | 8.06692E−01 | 7.63452E−01 |
| A4 | −1.72755E−04 | −1.44517E−02 | −2.91633E−02 | −2.13342E−02 | −1.40298E−02 |
| A6 | −4.03855E−04 | −2.07054E−02 | −1.10654E−02 | −4.06166E−03 | 1.89814E−04 |
| A8 | 1.80080E−04 | 1.26644E−02 | 4.35090E−03 | −2.18997E−04 | −5.57783E−04 |
| A10 | 1.62688E−04 | −7.11193E−03 | −6.87270E−03 | −5.78620E−04 | 2.03804E−04 |
| A12 | — | — | 3.91678E−03 | −8.98896E−05 | — |
| A14 | — | — | — | 2.76678E−06 | — |

| | Surface # | | | | |
|---|---|---|---|---|---|
| | 7 | 8 | 9 | 10 | 11 |
| k | −1.73187E−01 | −1.83378E+00 | −9.82589E−01 | −8.10013E+00 | −7.71259E+01 |
| A4 | −5.12916E−03 | −3.96780E−02 | 1.21072E−02 | −2.19741E−03 | 1.59275E−03 |
| A6 | −1.48602E−03 | 1.00386E−02 | −1.14956E−03 | 3.51887E−04 | −4.73570E−04 |
| A8 | 2.25790E−04 | −8.05941E−04 | 1.99197E−04 | −1.81000E−04 | −4.26605E−05 |
| A10 | −2.36862E−05 | — | 8.79146E−06 | 1.91822E−05 | 6.41126E−06 |
| A12 | — | — | −3.59680E−06 | −8.81348E−07 | −2.75483E−07 |
| A14 | — | — | 1.63187E−07 | — | — |

The content of Table 4-3 may be deduced from Table 4-1.

TABLE 4-3

| Embodiment 4 | |
|---|---|
| f (mm) | 6.04 |
| Fno | 2.87 |
| HFOV (deg.) | 32.7 |
| $V_2 - V_4$ | 32.1 |
| $T_{12}/T_{23}$ | 0.41 |
| $ET_{34}/T_{34}$ | 0.48 |
| R8/f | −0.33 |
| f/f2 | 1.20 |
| f2/f3 | 0.61 |
| SD/TD | 0.85 |

FIG. 4B is a graph of longitudinal spherical aberration curves when the lights having wavelengths of 486.1 nm (L), 587.6 nm (M), and 656.3 nm (N) are projected in the photographing optical lens assembly 40 in FIG. 4A. From FIG. 4B, the corresponding longitudinal spherical aberrations generated by the photographing optical lens assembly 40 are shown within a range of −0.05 mm to 0.05 mm.

FIG. 4C is a graph of astigmatic field curves from a tangential plane (T) and a sagittal plane (S). From FIG. 4C, the astigmatic field curvature of the tangential plane is within a range of −0.025 mm to 0.02 mm, and the astigmatic field curvature of the sagittal plane is within a range of −0.05 mm to 0 mm.

FIG. 4D is a graph of a distortion curve in the photographing optical lens assembly 40 in FIG. 4A. It can be observed from FIG. 4D that the distortion ratio is within a range of −0.5% to 1.0%. As shown in FIGS. 4B to 4D, the photographing optical lens assembly 40, designed according to the fourth embodiment, is capable of effectively correcting various aberrations.

The Fifth Embodiment (Embodiment 5)

Figure 5A:
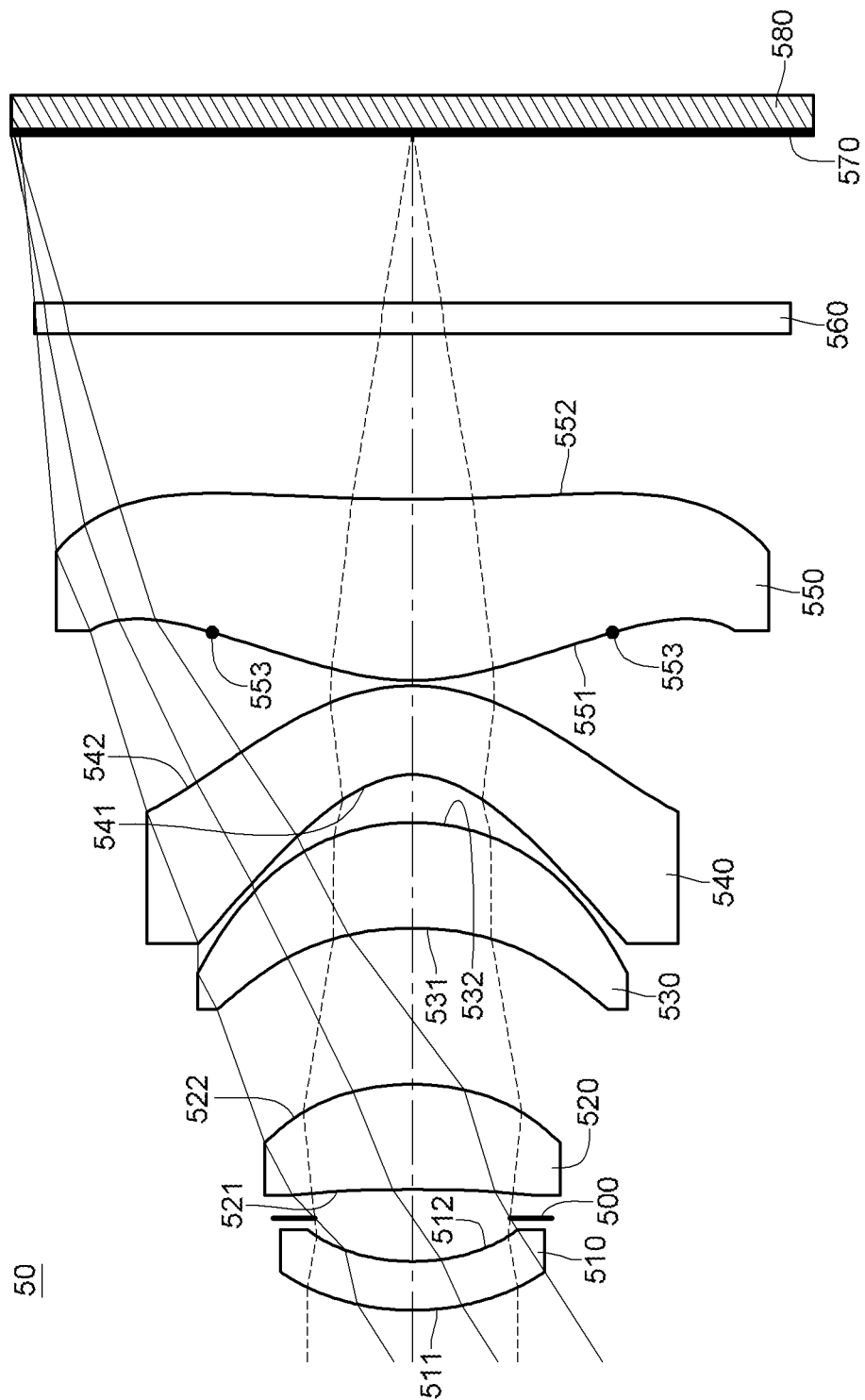
FIG. 5A is a schematic structural view of a fifth embodiment of a photographing optical lens assembly.

FIG. 5A is a schematic structural view of the fifth embodiment of the photographing optical lens assembly. The specific implementation and elements of the fifth embodiment are substantially the same as those in the first embodiment. The element symbols in the fifth embodiment all begin with "5" which correspond to those in the first embodiment with the same function or structure. For conciseness, only the differences are illustrated below, and the similarities will not be repeated herein.

In this embodiment, for example, the reference wavelength of the light received by the photographing optical lens assembly 50 is 587.6 nm.

In this embodiment, a first lens element 510 with negative refractive power comprises a convex object-side surface 511 and a concave image-side surface 512. A second lens element 520 with positive refractive power comprises a convex object-side surface 521 and a convex image-side surface 522. A third lens element 530 with positive refractive power comprises a concave object-side surface 531 and a convex image-side surface 532. A fourth lens element 540 with negative refractive power comprises a concave object-side surface 541 and a convex image-side surface 542. A fifth lens element 550 with positive refractive power comprises a convex object-side surface 551, a concave image-side surface 552 and at least one inflection point 553.

The detailed data of the photographing optical lens assembly 50 is as shown in Table 5-1 below.

TABLE 5-1

Embodiment 5
f = 6.10, Fno = 3.00, HFOV = 32.6 deg.

| Surface # | | Curvature radius(mm) | Thickness (mm) | Material | Index | Abbe # | Focal length (mm) |
|---|---|---|---|---|---|---|---|
| 0 | Object | Plano | Infinity | | | | |
| 1 | Lens 1 | 2.468550(ASP) | 0.472 | Plastic | 1.640 | 23.3 | −26.31 |
| 2 | | 1.992230(ASP) | 0.418 | | | | |
| 3 | Ape. Stop | Plano | 0.278 | | | | |
| 4 | Lens 2 | −29.673600(ASP) | 1.019 | Plastic | 1.544 | 55.9 | 4.89 |
| 5 | | −2.472190(ASP) | 1.512 | | | | |
| 6 | Lens 3 | −2.973250(ASP) | 1.022 | Plastic | 1.535 | 56.3 | 10.28 |
| 7 | | −2.160310(ASP) | 0.464 | | | | |
| 8 | Lens 4 | −0.847840(ASP) | 0.861 | Plastic | 1.640 | 23.3 | −3.66 |
| 9 | | −1.857070(ASP) | 0.050 | | | | |
| 10 | Lens 5 | 2.300710(ASP) | 1.756 | Plastic | 1.544 | 55.9 | 4.63 |
| 11 | | 19.230800(ASP) | 1.600 | | | | |
| 12 | IR-cut filter | Plano | 0.300 | Glass | 1.516 | 64.1 | — |
| 13 | | Plano | 1.618 | | | | |
| 14 | Image Plane | Plano | — | | | | |

Note:
Reference wavelength is d-line 587.6 nm

In Table 5-1, from the object-side surface 511 to image-side surface 552, all the surfaces can be aspheric, and the aspheric surfaces can satisfy Condition ASP, but are not limited thereto. As for the parameters of the aspheric surfaces, reference is made to Table 5-2 below.

TABLE 5-2

Aspheric Coefficients

| | Surface # | | | | |
|---|---|---|---|---|---|
| | 1 | 2 | 4 | 5 | 6 |
| k | 3.40340E−01 | 1.91141E+00 | 1.00000E+00 | 5.33045E−01 | 9.74708E−01 |
| A4 | −4.54095E−04 | −1.63063E−02 | −2.06813E−02 | −1.67467E−02 | −1.01970E−02 |
| A6 | −1.57521E−03 | −2.41103E−02 | −1.15274E−02 | −4.02034E−03 | 7.96391E−04 |
| A8 | 1.45892E−03 | 1.91901E−02 | 5.05576E−03 | 9.51642E−04 | 7.87207E−05 |
| A10 | 2.91486E−04 | −1.26194E−02 | 4.26000E−03 | 2.71012E−04 | 2.10532E−04 |
| A12 | — | — | −1.10194E−04 | −1.15724E−03 | — |
| A14 | — | — | — | 5.63132E−04 | — |

| | Surface # | | | | |
|---|---|---|---|---|---|
| | 7 | 8 | 9 | 10 | 11 |
| k | −1.48833E−01 | −2.00550E+00 | −1.04254E+00 | −7.02968E+00 | −1.70025E+01 |
| A4 | −8.76874E−03 | −4.22901E−02 | 1.32040E−02 | −1.56014E−03 | −1.23902E−03 |
| A6 | −1.23942E−03 | 1.01700E−02 | −1.05327E−03 | 3.08552E−04 | −2.78032E−04 |
| A8 | 3.36590E−04 | −8.12018E−04 | 2.03459E−04 | −1.74111E−04 | −4.18139E−05 |
| A10 | 3.24348E−05 | — | 5.16210E−06 | 1.95070E−05 | 5.85250E−06 |
| A12 | — | — | −4.31884E−06 | −8.70757E−07 | −2.48019E−07 |
| A14 | — | — | 2.82594E−07 | — | — |

The content of Table 5-3 may be deduced from Table 5-1.

TABLE 5-3

Embodiment 5

| f (mm) | 6.10 |
|---|---|
| Fno | 3.00 |
| HFOV (deg.) | 32.6 |
| $V_2 − V_4$ | 32.6 |
| $T_{12}/T_{23}$ | 0.46 |
| $ET_{34}/T_{34}$ | 0.61 |
| $R_8/f$ | −0.30 |
| $f/f_2$ | 1.25 |

TABLE 5-3-continued

Embodiment 5

| $f_2/f_3$ | 0.48 |
|---|---|
| SD/TD | 0.89 |

FIG. 5B is a graph of longitudinal spherical aberration curves when the lights having wavelengths of 486.1 nm (L), 587.6 nm (M), and 656.3 nm (N) are projected in the photographing optical lens assembly 50 in FIG. 5A. From FIG. 5B, the corresponding longitudinal spherical aberrations generated by the photographing optical lens assembly 50 are shown within a range of −0.05 mm to 0.05 mm.

FIG. 5C is a graph of astigmatic field curves from a tangential plane (T) and a sagittal plane (S). From FIG. 5C, the astigmatic field curvature of the tangential plane is within a range of −0.05 mm to 0.01 mm, and the astigmatic field curvature of the sagittal plane is within a range of −0.06 mm to 0 mm.

FIG. 5D is a graph of a distortion curve in the photographing optical lens assembly 50 in FIG. 5A. It can be observed from FIG. 5D that the distortion ratio is within a range of −1.0% to 0.5%. As shown in FIGS. 5B to 5D, the photographing optical lens assembly 50, designed according to the fifth embodiment, is capable of effectively correcting various aberrations.

The Sixth Embodiment (Embodiment 6)

Figure 6A:
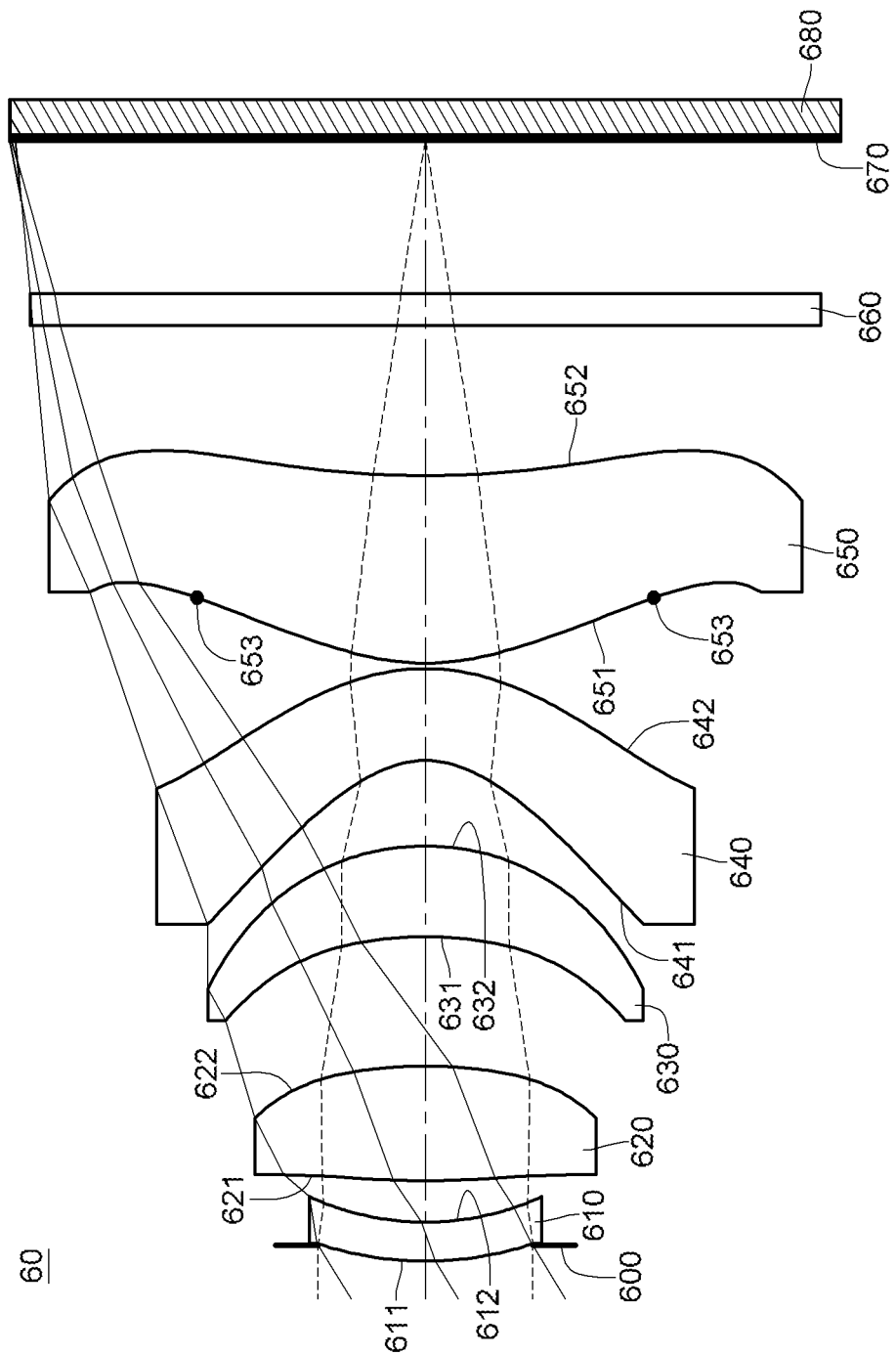
FIG. 6A is a schematic structural view of a sixth embodiment of a photographing optical lens assembly.

FIG. 6A is a schematic structural view of the sixth embodiment of the photographing optical lens assembly. The specific implementation and elements of the sixth embodiment are substantially the same as those in the first embodiment. The element symbols in the sixth embodiment all begin with "6" which correspond to those in the first embodiment with the same function or structure. For conciseness, only the differences are illustrated below, and the similarities will not be repeated herein.

In this embodiment, for example, the reference wavelength of the light received by the photographing optical lens assembly 60 is 587.6 nm.

In this embodiment, a first lens element 610 with negative refractive power comprises a convex object-side surface 611 and a concave image-side surface 612. A second lens element 620 with positive refractive power comprises convex image-side surface 621 and a convex object-side surface 622. A third lens element 630 with positive refractive power comprises a concave object-side surface 631 and a convex image-side surface 632. A fourth lens element 640 with negative refractive power comprises a concave object-side surface 641 and a convex image-side surface 642. A fifth lens element 650 with positive refractive power comprises a convex object-side surface 651, a concave image-side surface 652 and at least one inflection point 653. In addition, a stop is between the object side and the first lens element 610. In this embodiment, the stop is, for example, an aperture stop 600.

The detailed data of the photographing optical lens assembly 60 is as shown in Table 6-1 below.

TABLE 6-1

Embodiment 6
f = 6.30, Fno = 3.15, HFOV = 31.5 deg.

| Surface # | | Curvature radius(mm) | Thickness (mm) | Material | Index | Abbe # | Focal length (mm) |
|---|---|---|---|---|---|---|---|
| 0 | Object | Plano | Infinity | | | | |
| 1 | Ape. Stop | Plano | −0.146 | | | | |
| 2 | Lens 1 | 3.037200(ASP) | 0.364 | Plastic | 1.634 | 23.8 | −29.02 |
| 3 | | 2.485590(ASP) | 0.387 | | | | |
| 4 | Lens 2 | 7.119100(ASP) | 1.070 | Plastic | 1.544 | 55.9 | 5.49 |
| 5 | | −4.875800(ASP) | 1.209 | | | | |
| 6 | Lens 3 | −3.678600(ASP) | 0.848 | Plastic | 1.544 | 55.9 | 8.65 |
| 7 | | −2.232770(ASP) | 0.800 | | | | |
| 8 | Lens 4 | −0.846060(ASP) | 0.857 | Plastic | 1.634 | 23.8 | −3.40 |
| 9 | | −1.939640(ASP) | 0.050 | | | | |
| 10 | Lens 5 | 2.090290(ASP) | 1.754 | Plastic | 1.544 | 55.9 | 4.57 |
| 11 | | 9.185700(ASP) | 1.400 | | | | |
| 12 | IR-cut filter | Plano | 0.300 | Glass | 1.516 | 64.1 | — |
| 13 | | Plano | 1.419 | | | | |
| 14 | Image Plane | Plano | — | | | | |

Note:
Reference wavelength is d-line 587.6 nm

In Table 6-1, from the object-side surface 611 to the image-side surface 652, all surfaces can be aspheric, and the aspheric surfaces can satisfy Condition ASP, but are not limited thereto. As for the parameters of the aspheric surfaces, reference is made to Table 6-2 below.

TABLE 6-2

Aspheric Coefficients

| | Surface # | | | | |
|---|---|---|---|---|---|
| | 1 | 2 | 4 | 5 | 6 |
| k | −9.60731E−01 | 2.73480E+00 | −2.72559E+01 | 2.51830E−01 | 9.03335E−01 |
| A4 | −8.81577E−03 | −4.10400E−02 | −1.29586E−02 | −2.28563E−02 | −1.60801E−02 |
| A6 | 9.42722E−03 | 1.08989E−03 | −5.79255E−03 | −3.44818E−03 | −8.02303E−04 |
| A8 | −4.11731E−03 | −2.90246E−03 | 2.55334E−03 | 7.85629E−05 | −7.84916E−04 |
| A10 | 1.11424E−03 | −2.85671E−03 | −3.00875E−03 | −2.34526E−04 | 2.31439E−04 |
| A12 | — | — | 1.68039E−03 | −2.08440E−05 | — |
| A14 | — | — | — | 2.03533E−05 | — |

TABLE 6-2-continued

Aspheric Coefficients

| | Surface # | | | | |
|---|---|---|---|---|---|
| | 7 | 8 | 9 | 10 | 11 |
| k | −1.85203E−01 | −2.08998E+00 | −1.01704E+00 | −6.30288E+00 | 2.11880E−01 |
| A4 | −3.03202E−03 | −4.05619E−02 | 1.27367E−02 | 1.23589E−03 | 8.96975E−04 |
| A6 | −1.79537E−03 | 1.01236E−02 | −1.09980E−03 | 2.35029E−04 | −5.07070E−04 |
| A8 | 1.62294E−04 | −8.02788E−04 | 2.07670E−04 | −1.83156E−04 | −4.64891E−05 |
| A10 | −2.20952E−05 | — | 1.04376E−05 | 1.92612E−05 | 6.21023E−06 |
| A12 | — | — | −3.55037E−06 | −8.43191E−07 | −2.33459E−07 |
| A14 | — | — | 1.40028E−07 | — | — |

The content of Table 6-3 may be deduced from Table 6-1.

TABLE 6-3

Embodiment 6

| f (mm) | 6.30 |
|---|---|
| Fno | 3.15 |
| HFOV (deg.) | 31.5 |
| $V_2 - V_4$ | 32.1 |
| $T_{12}/T_{23}$ | 0.32 |
| $ET_{34}/T_{34}$ | 0.75 |
| $R_8/f$ | −0.31 |
| $f/f_2$ | 1.15 |
| $f_2/f_3$ | 0.63 |
| SD/TD | 0.98 |

FIG. 6B is a graph of longitudinal spherical aberration curves when the lights having wavelengths of 486.1 nm (L), 587.6 nm (M), and 656.3 nm (N) are projected in the photographing optical lens assembly 60 in FIG. 3A. From FIG. 6B, the corresponding longitudinal spherical aberrations generated by the photographing optical lens assembly 60 are within a range of −0.025 mm to 0.05 mm.

FIG. 6C is a graph of astigmatic field curves from a tangential plane (T) and a sagittal plane (S). It can be observed from FIG. 6C that the astigmatic field curvature of the tangential plane is within a range of −0.05 mm to 0.025 mm, and the astigmatic field curvature of the sagittal plane is within a range of −0.05 mm to 0 mm.

FIG. 6D is a graph of a distortion curve in the photographing optical lens assembly 60 in FIG. 6A. It can be observed from FIG. 6D that the distortion ratio is within a range of −0.5% to 1.5%. As shown in FIGS. 6B to 6D, the photographing optical lens assembly 60, designed according to the sixth embodiment, is capable of effectively correcting various aberrations.

What is claimed is:

1. A photographing optical lens assembly comprising, in order from an object side to an image side:
   a first lens element with negative refractive power comprising a convex object-side surface;
   a second lens element with positive refractive power;
   a third lens element with positive refractive power comprising a concave object-side surface and a convex image-side surface;
   a fourth lens element with negative refractive power comprising a concave object-side surface and a convex image-side surface; and
   a fifth lens element with positive refractive power comprising an object-side surface, an image-side surface and at least one inflection point, and at least one of the object-side surface and the image-side surface being aspheric, wherein the object-side surface of the fifth lens element is convex and the fifth lens element is made of plastic, and wherein the photographing optical lens assembly further satisfies the following condition:

$0.75 < f/f2 < 1.7$, wherein f is the focal length of the photographing optical lens assembly and f2 is the focal length of the second lens element.

2. The photographing optical lens assembly according to claim 1, wherein the photographing optical lens assembly satisfies the following condition:

$20 < V_2 - V_4 < 70$;

wherein $V_2$ is the Abbe number of the second lens element; $V_4$ is the Abbe number of the fourth lens element.

3. The photographing optical lens assembly according to claim 1, further comprising a stop and an image plane, and the photographing optical lens assembly satisfying the following condition:

$0.75 < SD/TD < 1.1$;

wherein SD is an axial distance between the stop and the image-side surface of the fifth lens element; TD is an axial distance between the object-side surface of the first lens element and the image-side surface of the fifth lens element.

4. The photographing optical lens assembly according to claim 1, wherein the photographing optical lens assembly satisfies the following condition:

$0.1 < f_2/f_3 < 0.8$;

wherein $f_2$ is the focal length of the second lens element; $f_3$ is the focal length of the third lens element.

5. The photographing optical lens assembly according to claim 1, wherein the photographing optical lens assembly satisfies the following condition:

$-0.6 < R_8/f < 0$;

wherein $R_8$ is the curvature radius of the image-side surface of the fourth lens element; f is the focal length of the photographing optical lens assembly.

6. The photographing optical lens assembly according to claim 5, wherein the photographing optical lens assembly satisfies the following condition:

$25° < HFOV < 38°$;

wherein HFOV is half of maximal field of view in the photographing optical lens assembly.

7. A photographing optical lens assembly comprising, in order from an object side to an image side:
- a front lens group, comprising two lens elements with refractive power and a stop, and the two lens elements comprising, in order from the object side to the image side:
  - a first lens element with negative refractive power comprising a convex object-side surface; and
  - a second lens element with positive refractive power; and
- a rear lens group, comprising, in order from the object side to the image side:
  - a third lens element with positive refractive power;
  - a fourth lens element with negative refractive power having a concave object-side surface and a convex image-side surface; and
  - a fifth lens element with positive refractive power comprising a convex object-side surface, an image-side surface and at least one inflection point, and at least one of the object-side surface and the image-side surface being aspheric;
- the photographing optical lens assembly further comprising an image plane, and satisfying the following condition:

$0.75 < SD/TD < 1.1;$ $0.75 < f/f_2 < 1.7;$ and $0.1 < T_{12}/T_{23} < 4.0;$ wherein $T_{12}$ is an axial distance between the first lens element and the second lens element; $T_{23}$ is an axial distance between the second lens element and the third lens element; SD is an axial distance between the stop and the image-side surface of the fifth lens element; TD is an axial distance between the object-side surface of the first lens element and the image-side surface of the fifth lens element; f is the focal length of the photographing optical lens assembly; f2 is the focal length of the second lens element.

8. The photographing optical lens assembly according to claim 7, wherein the photographing optical lens assembly satisfies the following condition:

$-0.6 < R_8/f < 0;$ wherein f is the focal length of the photographing optical lens assembly; $R_8$ is the curvature radius of the image-side surface of the fourth lens element.

9. The photographing optical lens assembly according to claim 7, wherein the third lens element comprises a concave object-side surface and a convex image-side surface, and the fifth lens element is made of plastic.

10. The photographing optical lens assembly according to claim 9, wherein the photographing optical lens assembly satisfies the following condition:

$0.9 < f/f_2 < 1.4;$ wherein f is the focal length of the photographing optical lens assembly; $f_2$ is the focal length of the second lens element.

11. The photographing optical lens assembly according to claim 9, wherein the photographing optical lens assembly satisfies the following condition:

$0.1 < f_2/f_3 < 0.8;$ wherein $f_2$ is the focal length of the second lens element; $f_3$ is the focal length of the third lens element.

12. The photographing optical lens assembly according to claim 9, wherein the photographing optical lens assembly satisfies the following condition:

$0.1 < T_{12}/T_{23} < 1.5;$ wherein $T_{12}$ is an axial distance between the first lens element and the second lens element; $T_{23}$ is an axial distance between the second lens element and the third lens element.

13. The photographing optical lens assembly according to claim 9, wherein the photographing optical lens assembly satisfies the following condition:

$25° < HFOV < 38°;$ wherein HFOV is half of maximal field of view in the photographing optical lens assembly.

14. A photographing optical lens assembly comprising five lens elements with refractive power, in order from an object side to an image side:
- a first lens element with negative refractive power comprising a convex object-side surface;
- a second lens element with positive refractive power;
- a third lens element with positive refractive power which comprises a concave object-side surface and a convex image-side surface;
- a fourth lens element with negative refractive power comprising a concave object-side surface and a convex image-side surface; and
- a fifth lens element with positive refractive power comprising a convex object-side surface, an image-side surface, and at least one inflection point, the fifth lens element being made of plastic and at least one of the object-side surface and the image-side surface being aspheric;
- the photographing optical lens assembly further comprising a stop and an image plane, and satisfying the following condition:

$0.75 < SD/TD < 1.1;$ and $-0.6 < R8/f < 0;$ wherein SD is an axial distance between the stop and the image-side surface of the fifth lens element; TD is an axial distance between the object-side surface of the first lens element and the image-side surface of the fifth lens element; and f is the focal length of the photographing optical lens assembly; R8 is the curvature radius of the image-side surface of the fourth lens element.

15. The photographing optical lens assembly according to claim 14, wherein the photographing optical lens assembly satisfies the following condition:

$0.75 < f/f_2 < 1.7;$ wherein f is the focal length of the photographing optical lens assembly; $f_2$ is the focal length of the second lens element.

16. The photographing optical lens assembly according to claim 14, wherein the photographing optical lens assembly satisfies the following condition:

$20 < V_2 - V_4 < 70;$ wherein $V_2$ is the Abbe number of the second lens element; $V_4$ is the Abbe number of the fourth lens element.

17. The photographing optical lens assembly according to claim 14, wherein the image-side surface of the fifth lens element is concave.

* * * * *